United States Patent [19]
Liu

[11] Patent Number: 5,404,555
[45] Date of Patent: Apr. 4, 1995

[54] MACRO INSTRUCTION SET COMPUTER ARCHITECTURE

[75] Inventor: Dali Liu, Beijing, China

[73] Assignee: Duosi Software Co., Ltd., Beijing, China

[21] Appl. No.: 882,295

[22] Filed: May 13, 1992

[30] Foreign Application Priority Data

May 17, 1991 [CN] China ............................... 91103198.7
May 21, 1991 [CN] China ............................... 91103441.2
Apr. 27, 1992 [CN] China ............................... 92103092.4

[51] Int. Cl.[6] ........................................... G06F 15/78
[52] U.S. Cl. ..................................... 395/800; 395/375;
364/232.8; 364/243.5; 364/247.7; 364/258;
364/260.2; 364/262.8; 364/DIG. 1
[58] Field of Search ............... 395/800, 775, 425, 375,
395/275, 250; 364/736

[56] References Cited

U.S. PATENT DOCUMENTS

| | | | |
|---|---|---|---|
| 4,800,491 | 1/1989 | Hardy | 364/735 |
| 4,812,971 | 3/1989 | Butts, Jr. et al. | 395/375 |
| 4,829,425 | 5/1989 | Bain, Jr. et al. | 395/275 |
| 4,841,434 | 6/1989 | Mathewes, Jr. et al. | 395/375 |
| 5,243,698 | 9/1993 | May | 395/200 |
| 5,319,757 | 6/1994 | Moose et al. | 395/375 |

Primary Examiner—Alyssa H. Bowler
Assistant Examiner—Alpesh M. Shah
Attorney, Agent, or Firm—Ladas & Parry

[57] ABSTRACT

The present invention relates to a macro instruction set computer (MISC) architecture having main memory for storing system softwares of the computer, instructions, and user programs; first memory for storing preparatory data for operations, intermediate results of operations and the final results of completed operations, and operating in stack form; second memory for storing the break point address of subprograms and address for recovery of the break point while returning from a call, and operating in stack form; a CPU having: address management for the main memory; main memory data port for receiving instructions and data from main memory and writing data in the CPU into main memory; control logic combinational decoding for decoding instructions from main memory and generating control signals controlling the operations of the computer; ALU for performing arithmetic and logic operation functions; top of stack, next to the top of stack and the third one to the top of stack register of the first memory; top of stack register and instruction repeating execution control of the second memory; management device for the first and second memory for performing operations of writing to and reading from the first and second memory.

12 Claims, 23 Drawing Sheets

MACRO INSTRUCTION SET COMPUTER ARCHITECTURE

FIELD OF THE INVENTION

The present invention relates to a computer achitecture, and particularly, relates to a macro instruction set computer (MISC) architecture. A microprocessor manufactured according to said architecture can employ the FORTH language as its machine assemble language. Based on the unique self-extensiveness of the FORTH laugnage per se, the FORTH machine assembly language of the architecture according to the present invention has more powerful functions than the prior art ones.

BACKGROUND OF THE INVENTION

Rich softwares have been implemented on current computer systems, with conventional high level languages (e.g., FORTRAN, COBOL, Pascal, Basic, etc.). However, the functions of those high level languages are limited, and the secondary developments of those languages per se have to be worked out by the manufacturers, but not with the help of the languages per se. In addition, although those languages are comparatively convenient and standardized in writing programs, the speed and efficiency of compiling are rather low for there exist too many interfaces between the language and the machine. Improvement of the quality and run—time efficiency of programs—is also severely restricted due to the non-transparency of the machine. For example, while programming in FORTRAN, a text editor software on the interface of the operating system should be first used to edit a FORTRAN source program file, then a two-pass scanning compiling has to be conducted on the source program file on the interface of the FORTRAN compiler system to produce a corresponding object program file; after passing compiling, the object file is then linked and allocated by the use of the linker software of the system on the interface of the operating system to produce an executable file, that could then be directly run on the interface of the operating system. When it is necessary for a FORTRAN program to invoke an assembly language program, a method similar to that for the producing of a FORTRAN object program file should be observed, so as to produce an assembly object program file by the use of the text editor software and the assembler of the system that is then linked and allocated together with the FORTRAN object program file. It can be seen that this compiling procedure is very tedious and too numerous in interface convertings, which greatly affects the speed and efficiency of compiling, particularly for a beginner.

Recently, high level software tools with simple interfaces, desirable structurization, improved compiling efficiency and self-extensiveness (secondary self development) have been searched for with increasing interest. From this, the fourth generation high level programming language FORTH has emerged to prominence.

The FORTH language system is different from other high level languages. Once a FORTH system is generated, it is not necessary to perform any interface converting, operations, because editing, compiling and running can be performed on the single interface layer of the FORTH system. This is because the FORTH system accommodates the main functions of the resident modules of the operating system and has its own text editor. In addition, the FORTH system includes a FORTH assembler of full structurization and one-pass scanning, which can directly compile and execute an assemble program in the FORTH system. Furthermore, the FORTH language is of many additional advantages over other high level languages, for example, it is fully structured, is capabale of self-extensiveness, is transparent, and has the shortest object code. As a result, the FORTH language has been widely used all over the world with increasing popularity.

However, all of the existing computers are Von Neumann computers. Each of this type of computers has a set of machine instructions. The CPU of the machine is only operative to analyze and execute this machine instruction set, and software development can only be done on the basis of this instruction system. Therefore, there is a need to develop a new generation of computers capable of directly executing the FORTH high level language.

Nowadays, the conventional computer architectures mainly adopt complex instruction set computer architecture, i.e., CISC architecture. For the purpose of achieving high speed of executing commands and at the same time simplifying the structure and circuitry as well as reducing the cost, a new computer architecture, known as the RISC (Reduced Instruction Set Computer) architecture has emerged. The characteristic of RISC computer is to execute each instruction in a single clock cycle; its instruction employing fixed format. The RISC architecture computer emphasizes the exploitation of load/store design to perform load from the memory and store into the memory with memory executing instruction manner. Besides, the RISC architecture computer employs hardward wiring to implement instruction control instead of microcode design to ensure high speed, single cycle execution of the operation code. Koopman of the United States proposed an interaction computer architecture in the end of 1987, which combines the RISC architecture and the CISC architecture to produce a more interesting, reasonable in configuration, flexible, and speedy machine. This architecture is termed as WISC (Writable Instruction Set Computer) architecture.

SUMMARY OF THE INVENTION

It is an object of the present invention to provide a new computer architecture, which is the hardware environment supporting the high level computer language FORTH. The primitive operations performed by this computer may describe very efficiently the semantic of the primitive words of the FORTH languaes, the primitive words of the FORTH language correspond to the "assembly instructions" of the computer. The computer architecture according to the present invention is one directly oriented to the fourth generation language, integrating the CISC, RISC and WISC techniques as will as the macro technique design.

The macro instruction set computer architecture (hereafter sometimes MISC) according to the present invention comprises main memory device for storing system softwares of the computer, instructions and user programs; first memory device for storing the initial data for operation, the intermediate results of operation and the final results worked out by the operation, and operating in the form of a stack; second memory device for storing the break point address of subprograms and the address for recovery of the break point while returning from a call, and operating in the form of a stack; a CPU comprising address management means for said main memory device, for forming addresses to access the main memory, which consists of a plurality of registers; main memory device data port, operative to receive instructions or data from the main memory device and to write the data in the CPU into the main memory device, which consists of a pulrality of registers; control logic combinational decoding means operative to decode the instructions from the main memory device to generate control signals controlling the operation of the computer; ALU means for performing arithmetic and logic operation functions, which consists of a pulrality of registers; data path focus means; square rooting means operative to perform hardware square rooting directly; top of stack, next to the top of stack, and the third one to the top of stack register means of the first memory device, which consists of a plurality of registers; top of stack register and instruction repeating execution control means of the second memory device, which consist of a plurality of registers; management means for the first memory device operative to perform write and read operations of the first memory device in response to a micro-operation controlling signal generated by the instruction decoding, said management means consists of a plurality of registers; management means for the second memory device operative to perform write and read operations of the second memory device in response to a micro-operation controlling signal generated by the instruction decoding, said management means consists of a plurality of registers; system clock signal and time control signal generator means; interrupt handling means consisting of a pulrality of registers; parallel data I/O port consisting of a plurality of registers; serial-parallel data converting I/O port consisting of a plurality of registers. The data bus and address bus between the main memory and CPU adopts wide bus structure. The data path focus means converges together the data from each of the registers of the second memory device, interrupt handling means, the top of stack register and instruction repeating execution control means of the second memory device, serial-parallel data converting port, parallel data I/O port, the top of stack, next to the top of stack and the third one to the top of stack register means, the management means of the first memory device, ALU means, data port of the main memory device, and the address management means of the main memory device, selects one path for the data under the control of the control signal generated by instruction decoding, and sends it to the ALU means to take part in the operation, whereby the contents of each of the registers within the CPU can take part in arithmetic and logic operations. The top of stack, next to the top of stack and the third one to the top of stack registers of the first memory device are the memory stack and data processing units of the first memory device located in the CPU. They are also important path of each of the register data in the CPU, the data path focus means selects one path of data to either input it to the ALU means, and sends the result after operation processing to the top of stack, next to the top of stack and the third one to the top of stack register means of the first memory device, or input it directly to the top of stack, next to the top of stake and the third one to the top of stack register means and diverges therefrom to each of the means of the CPU or transfter to the peripheral devices via the serial-parallel data converting I/O port and the parallel I/O port, thereby, links up data transmission paths between each of the registers in the CPU and the registers in the CPU with the peripheral devices.

The present invention further proposes a macro-instruction set instruction system. The instruction fields used by the instruction of this instruction system comprise operation type code field, functional unit operation control code field, return indicator field, and address/data field. Zero overhead can be realized in the call and return of program structure by the use of the instruction system according to the present invention, and single cycle load/store operation of mixed word length can also be realized thereby.

Multiplication and division operation control field, addition and subtraction operation control field, shift operation control field, logic operation control field as well as data flow control field corresponding to each of the operation components of the ALU respectively are also provided in the instructions of the instruction system according to the present invention. They assign different code to different paths on which data flow between each of the components inside the ALU, thereby, controlling the sequence and direction of each component through which data flow, and achieving the object of programmable operation sequence.

DETAILED DESCRIPTION OF THE INVENTION

Figure 1:
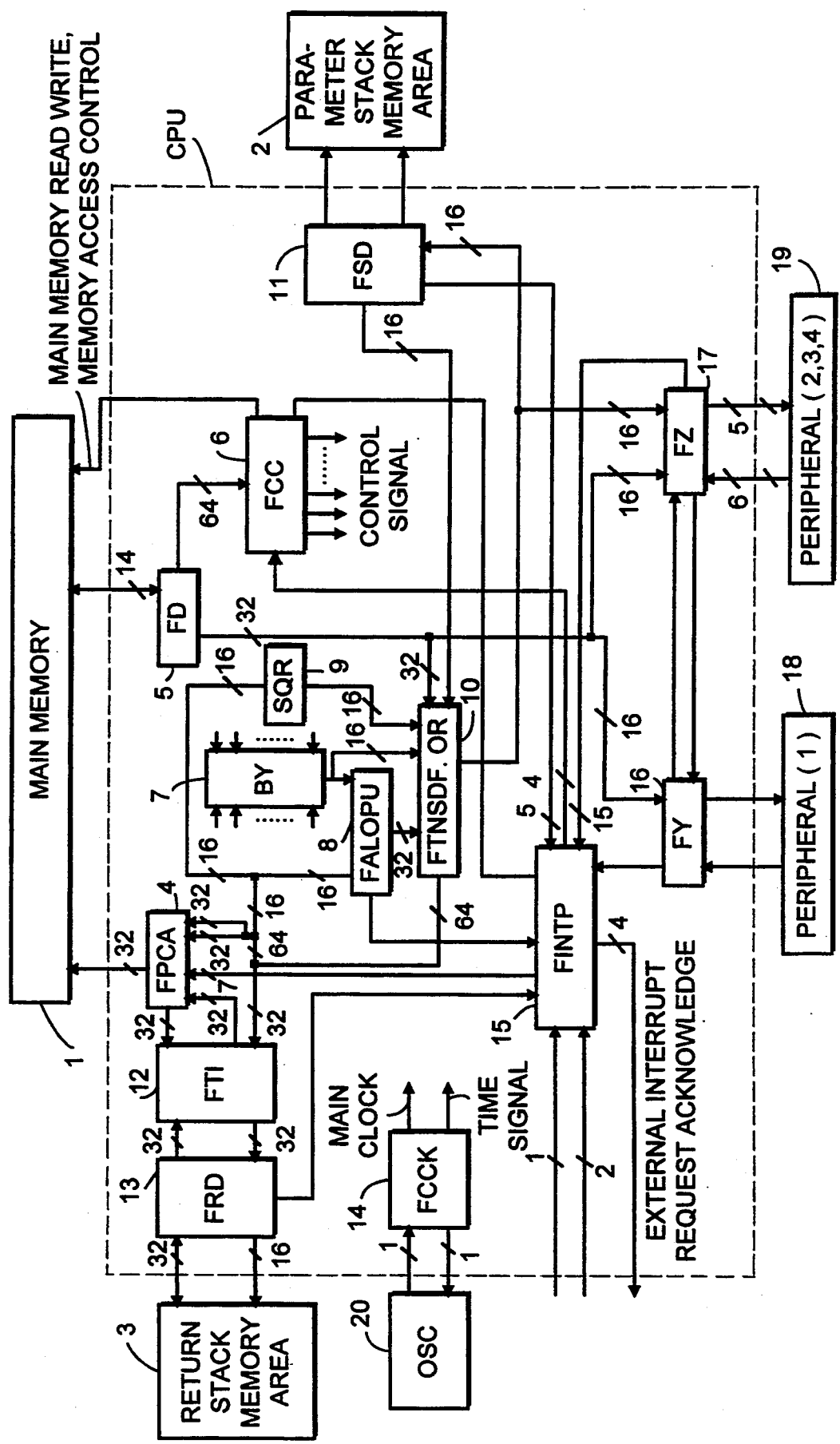
FIG. 1 is a general block diagram showing the architecture of the computer according to the present invention.

FIG. 1 is a schematic diagram showing the computer architecture according to the present invention, wherein, 1 a main memory device, 2 a parameter stack memory area, 3 return stack memory area, 4 main memory address management component (FPCA), 5 main memory data port (FD), 6 control logic combinational decoding component (FCC), 7 CPU internal register data focus component (BY), 8 ALU component (FALOPU), 9 square rooting hardware path (SQR), 10 top of stack, next to the top of stack, the third one to the top of stack registers of the parameter stack (FINSDFOR), 11 parameter stack management component (FSD), 12 top of stack register of return stack, instruction repeating execution control component (FTI), 13 return stack management component (FRD), 14 system clock generating component (FCLK), 15 CPU interrupt handling component (FINTP), 16 16-bit parallel data I/O port (FY), 17 serial-parallel data converting I/O port (FZ), 18 peripheral device (1), 19 peripheral device (2, 3, 4), 20 oscillation pulse generator. It can be seen from FIG. 1 that one of the characteristics of the hardware system of the MISC architecture according to the present invention lies in the wide bus structure (64-bit data bus and 32-bit address bus) between main memory area and CPU, this structure greatly alleviates the bottleneck problem of data transmission between CPU and main memory area. This is because if the internal word length is 16 bits, the throughput of the bus at one time is four words, together with the inherent feature of performing LOAD/STORE instruction in a single cycle of the MISC architecture computer accoding to the present invention, thereby, data transmission of four groups of 16-bit data between the CPU and main memory can be performed in one cycle (if the internal word length of the CPU is 32-bit, then the 64-bit wide bus can still accommodate two groups of data). The wide bus structure not only alleviates the bottleneck of data transmission between CPU and main memory, but also is adapted to the requirement of the superlong instruction format (length of 64-bit) of the instruction system of the MISC architecture according to the present invention, so as one of this type of superlong instructions can be read at a time via the wide, bus, and in cooperation with the instruction pre-fetching and preprocessing functions similar to those of conventional computers, the efficiency of instruction processing of the MISC architecture computer according to the present invention is far beyond that of the conventional computers. The superlong format instruction makes it possible to drive the submodules of CPU and the functional components in the computer system to run parallelly only after few times of decoding of the instruction (two or three stages of decoding), this makes the processing speed of the MISC architecture computer according to the present invention more than tens times higher than that of conventional computers with similar complexity. With 32-bit address, the MISC architecture computer according to the present invention can access up to 4G×64 bit of physical real address space of main memory (because the capacity of each address location is 64-bit for the main memory of the MISC architecture computer according to the present invention, referring to the following description of the main memory data port for details), which may substantially satisfy the requirement of memory space of common applications, thereby, it is no more necessary to use virtual memory and virtual memory address.

The focus component of the CPU internal registers converges the data from each of the submodule registers inside the CPU, and selects one of them to be transferred to the ALU to take part in operation under the control of a control signal generated by decoding, thereby, all the contents of the registers inside the CPU may take part in arithmetic and lobic operation processing. In order to support the FORTH languaes, the MISC architecture computer according to the present invention has provided in its hardware system a parameter stack as the main location for data processing in FORTH language, and a return stack as saving location for the break point address for returning from program structure call, respectively. Since stack operations mainly concentrated on the first several data items on the top of stack, therefore, the MISC architecture computer according to the present invention puts the first four memory cells on the top of the parameter stack in the CPU and implements them in the form of registers. At the same time, the first four registers of the parameter stack in the CPU are connected to the parameter stack memory area autside the CPU component of the CPU to constitute a parameter stack hardware structure cooperatively, to achieve the unification of high efficiency and low cost (since implementing mass storage device with existing memory chips outside CPU is less expensive than implementing them with ad hoc designed ones inside the CPU). The first two cells of the top of the return stack are also put into the CPU of the MISC architecture computer according to the present invention, and constituted by registers, while the other portion of the return stack is provided outside the CPU, and constituted by hardware memory, both of them are linked together by the use of a return stack management component inside the CPU to form a hardware structure of the return stack cooperatively (since the processing of the break point address in the return stack usually involves the first two cells on the top of stack only, so only two registers of the top of stack and the next to the top of stack are provided inside the CPU).

In the hardware system of the MISC architecture computer according to the present invention, the top of stack, next to the top of stack and the third one to the top of stack submodule of the parameter stack is not only used as data processing elements of the memory struck portion inside the CPU of the parameter stack memory area, they are also important paths for data of each of the registers inside the CPU of the MISC architecture computer according to the present invention. It can be seen from FIG. 1 that after the data in the registers of the CPU have converged at the focus component, one of the data ready to be processed is input to the ALU, and then transferred to the top of stack, next to the top of stack and the third one to the top of stack register component of the parameter stack after operation processing, or directly transfured to said register component without any operation processing, and then diverges to the functional submodules inside the CPU via the output data lines of said register component, or be sent to the periferal devices via the serial-parallel data converting I/O or the 16-bit parallel I/O port, thereby, data transmission paths are established between the registers inside the CPU as well as between the internal registers of the CPU and the peripheral devices. Also, the top of stack of the parameter stack is the unique implementation of the result of processing of the FORTH language, the combination of this feature and the constitution of the data path structure mentioned above makes the implementation of all of the data in the CPU registers possible and can be retrieved by the user.

The constitution manner of the structure of focussing register data by the focus component and diverging them by the parameter stack registers is on of the important features of the hardware system of the MISC architecture computer according to the present invention.

Multiplexers are one of the most used device in the hardware system of the MISC architecture computer according to the present invention. Actually, the focus component is constituted by multiplexers, while all of the input data to the registers of each of the submodules inside the CPU are multi-source data (from multiple sources inside the CPU) and selected and generated by multiplexers under the control of control signals resulting from instruction decoding. The application of multiplexers in the data paths of the hardware system of the MISC architecture computer according to the present invention is another important feature of the hardware system of the MISC architecture computer according to the present invention.

It can be seen from FIG. 1, the capacity of the memory area of the parameter stack outside the CPU can be up to 64K×16-bit, while that of the return stack outside the CPU can be up to 64K×32-bit.

The oscillating pulse signals generated by the oscillating pulse generator outside the CPU are processed by the system clock and time signal generating component to produce the system clock signals and time control signals required by the hardware system of the MISC architecture computer according to the present invention.

The CPU interrupt handling component receives the external urgent interrupt request from outside the CPU; external non-urgent interrupt request; whole stack overflow and partitioned stack overflow overflow interrupt request of the parameter stack from the parameter stack management compnent inside the CPU; whole stack overflow and partitioned stack overflow interrupt request of the return stack from the return stack management component inside the CPU; arithmetic overflow interrupt request of the ALU component; program interrupt request of the control and decoding component; interrupt request of the serial-parallel data converting I/O port; and interrupt request from the 16-bit parallel data I/O port, and performs processing operations of collecting, queneing according to their priority level, interrupt processing masking, interrupt processing nesting, hold/cancel of interrupt request, etc., on those interrupt requests, as well as generates an interrupt enabling signal when an interrupt is allowed to occur, and controls the CPU to enter an interrupt handling process. An interrupt vector corresponding to the current interrupt is generated directly by hardware so as the operation of searching the interrupt vector table is eliminated, and the interrupt handling efficiency is greatly improved. At the same time with responding to an interrupt request from outside the CPU, the interrupt handling component issues an interrupt acknovolodging signal to the device outside the CPU requesting the interrupt.

The 16-bit parallel data I/O port connects the CPU to a parallel peripheral device. The serial-parallel data converting I/O port comprises three independent serial/parallel data converting ports, enabling the CPU to connect with three peripheral devices, and performs data transmission between the CPU and the, coupled peripheral device with selected one out of eight frequencies, i.e., 300, 600, 1200, 2400, 4800, 9600, 19200 and 38400 bps (band rate), or the main frequency of CPU, in synchronous full duplex, asynchronous full duplex, or half duplex serial communication according to RS-232 data transmission protocol (the CPU transmits data with the peripheral device in serial mode, while said data port transmits data with other components in the CPU in parallel mode, therefore, the port is called as serial-parallel data converting I/O port).

Figure 2:
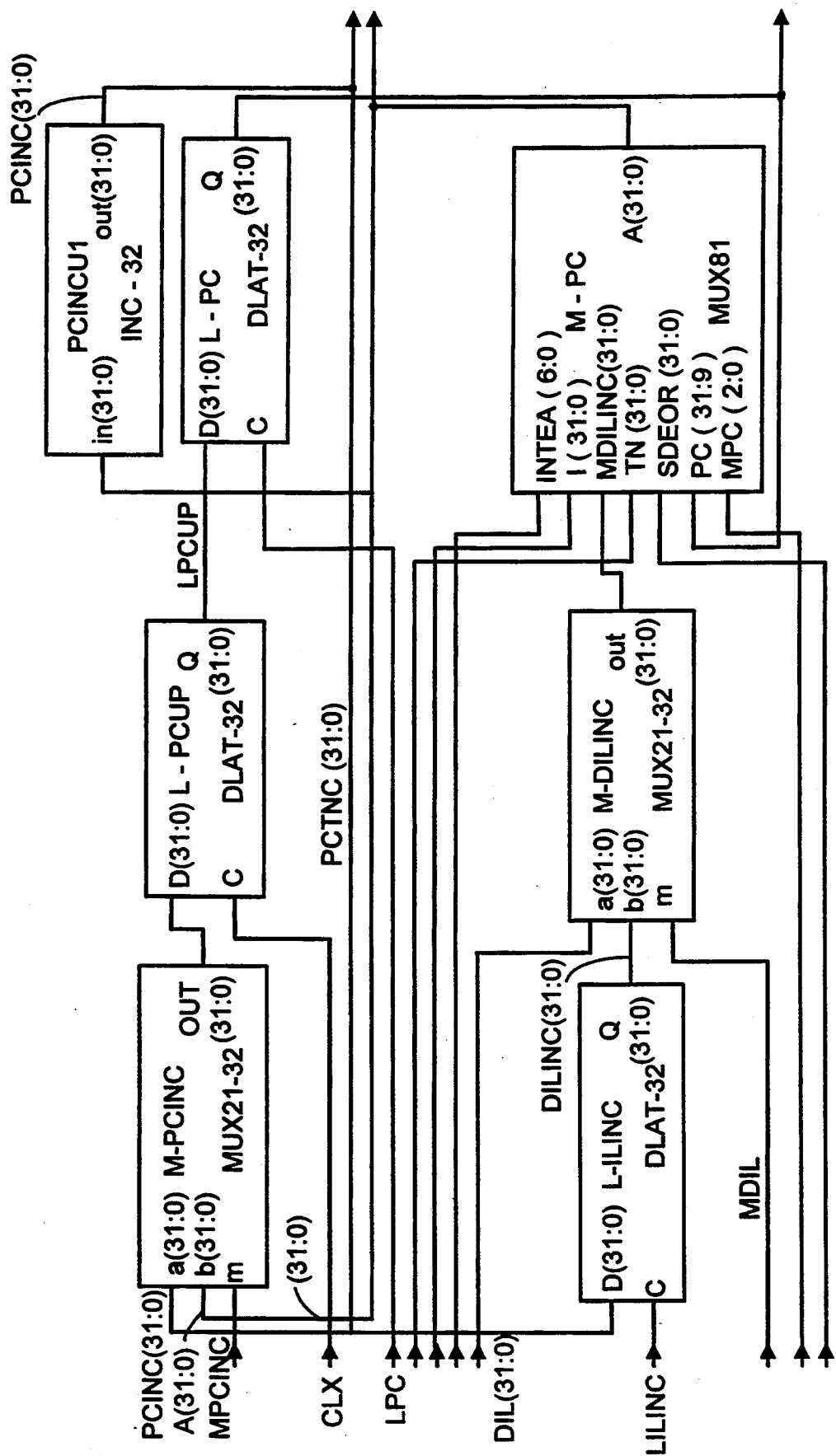
FIG. 2 is a schematic diagram showing the address management component for the access address of the main memory device according to the present invention.

FIG. 2 shows the main memory address management component in the CPU of the MISC architecture computer accoding to the present invention. It consists of a 32-bit one out of eight multiplexer M-PC, a 32-bit one out of two multiplexer M-PCINC, a 32-bit one out of two multiplexer M-DILINC, three 32-bit latches L-ILINC, L-PCUP and L-PC, and a 32-bit incrementer PCINCU1. Wherein, M-PC selects an address data A<31:0> for generating the current memory access operation from six different address sources in the CPU (they are respectively: the interrupt vector IN-TEA<6:0> from the interrupt handling component FINTP, the most significant 25 bits being filled with the value of INTEA<0>; I<31:0> from the top of stack registers of the return stack and instruction repeating execution control component FTC; TN<31:0> and SDFOR<31:0> from the top of stack, next to the top of stack and the third one to the top of stack register component FINSDFOR of the parameter stack; and MDILINC<31:0> from M-DILINC, PC<31:0> from L-PC inside FPCA) under the control of the control signal MPC<2:0> (from the control and decoding component, and sends it to the main memory via the bi-directional I/O PAD located in the main memory data port component FD (referring to the description of FD in FIG. 3). L-PC and L-PCUP are registers having upper and lower level structure (referring to the following description portion of the dual latch structure register), which latches the data DPLINC<31:0> resulting from the selection of M-PCINC from the memory access address data A<31:0> and the data PCINC<31:0> under the control of MPCINC (from the control and decoding component), wherein PCINC (31:0) is resulted from the address data PCINC<31:0> is resulted from A<31:0> after incremented by 1 by PCINCU1, thereby the current program counter data<31:0> of the computer is obtained.

L-ILINC is a 32-bit latch operative to latch PCINC<31:0> and generate DILINC<31:0>, DILINC<31:0> and the 32-bit data DIL<31:0> from the main memory data port component FD generate MDILINC<31:0>, one of the data sources of M-PC after one out of two selection processing by M-DILINC under the control of MDIL.

Figure 3:
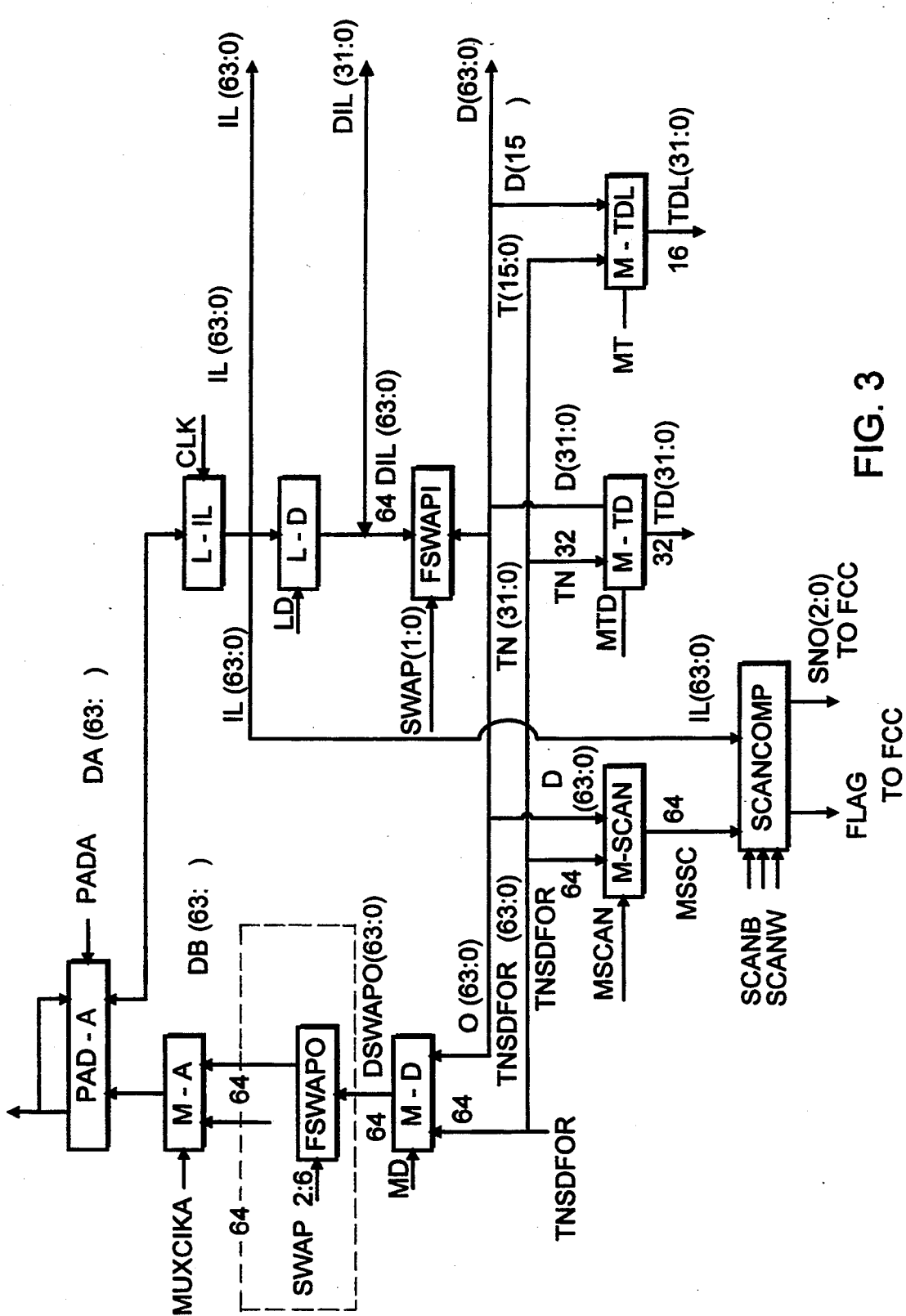
FIG. 3 is a schematic diagram showing the data port component of the main memory device according to the present invention.

FIG. 3 shows the data port coupling the CPU of the MISC architecture computer according to the present invention to the main memory, wherein the 64-bit bi-directionl I/O PAD-A transmits a 64-bit mixed data consisting of address data (32 bits), main memory read/write control (1 bit) and main memory access unit byte control (8 bits) in the positive half cycle of the system clock under the control of the control signal MUX-CLKA (from the control and decoding component) of M-A (64-bit one out of two selector); and performs data I/O preocessing in the negative half cycle of the system clock, with the I/O direction controlled by the PADA signal (from the control and decoding component). FD may be divided into a data input path portion and a data output path portion. The data input path consists of 64-bit registers L-IL and L-D of upper and lower level latch structure and input data byte swapping submodule FSWAPI while the output path consists of output data byte swapping submodule FSWAPO and output data selector M-D (64-bit one out of two selector). The FD module further comprises a comparator SCANCOMP (performing the functions of the words $= and SCAN in the FORTH language); one input of the comparator is connected to a data selector M-SCAN (64-bit one out of two multiplexer); and selector M-TD (32-bit one out of two multiplexer) and M-TDL (16-bit one out of two multiplexer) for generating the CPU internal TD bus data.

Figure 4:
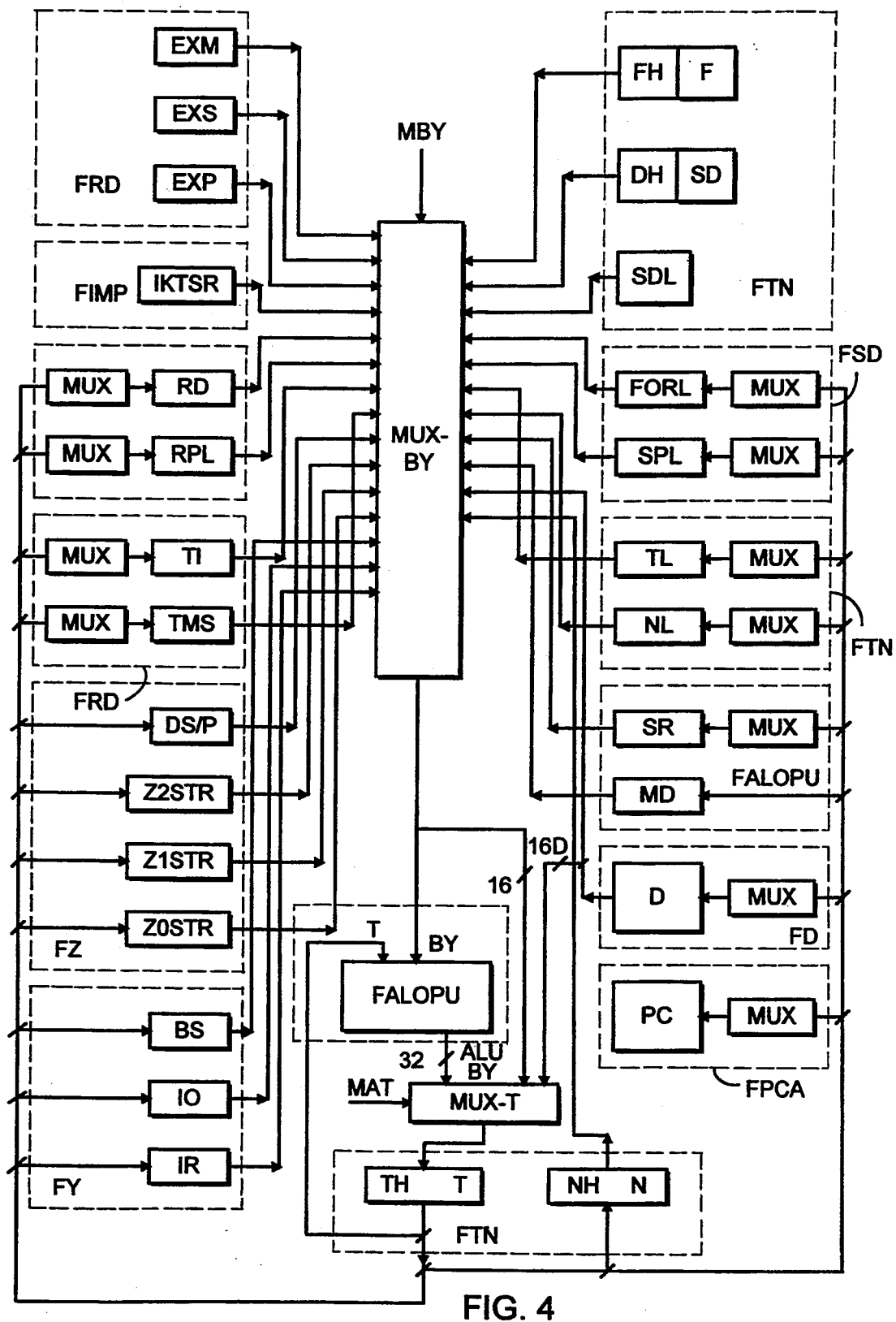
FIG. 4 is a schematic diagram showing the focus component for the data paths of each of the internal registers of the CPU according to the present invention.

FIG. 4 illustrates the focus component BY for converging the data of the CPU internal registers, BY converges together the contents of all the registers in the CPU, the BY consisting of multiplexers and controlled by MBY (control signal from the control and decoding component) selects the data required by the current operation to be sent to the ALU component FALOPU or sent to the top of stack, next to the top of stack register. It is one of the most important constituting components of the data path in the hardware system of the MISC architecture computer according to the present invention.

The component units to which each of the registers belongs to are as follows: EXM, EXS, EXR, RD and and RPL belong to the return stack management component FRD; INTSR belongs to the interrupt handling component FINTP; TI and TMS belong to the top of stack register of the return stack and instruction repeating execution control component FTI; DS/P, E25TR, Z1STR and Z0STR belong to the serial-parallel data converting I/O port FZ YBS, YIO and YR belong to the 16-bit parallel data I/O port FY; TH, T, NH, N, TL, NL, SDH, SD, FH, F and SDL belong to the top of stack, next to the top of stack and the third one to the top of stack register component FTN; FORL and SP1 belong to the parameter stack management component FSP; SR and MD belong to the ALU component FALOPU; D belongs to the main memory data port FD; and PC belongs to the main memory address management component FPCA.

Figure 5A:
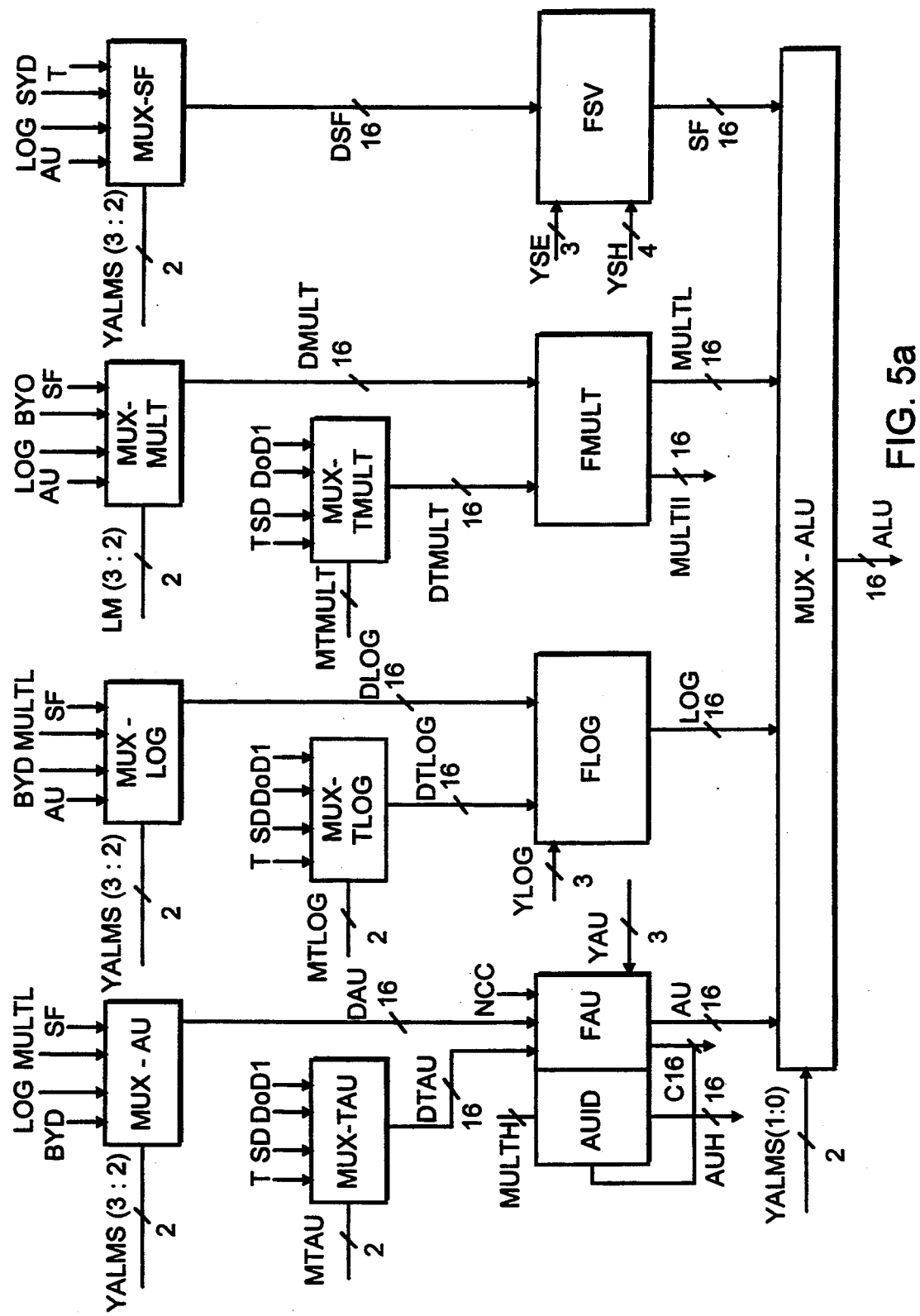
FIG. 5(a) is a schematic diagram showing the ALU component according to the present invention.

FIG. 5(a) shows the processing component FALOPU for arithmetic operations and logic operations of the MISC architecture computer according to the present invention. It can be seen from the diagram that this component consists of four submodules, and further comprises some data multipliexers for selecting operands, as path controls for the operand data.

FAU is a 16-bit adder which performs addition and subtraction processing, while AUID is a 16-bit adder provided for performing addition processing on the most signifinnt 16-bits of the 32-bit data result of multiplication in the *+processing of compound operation.

Figure 5B:
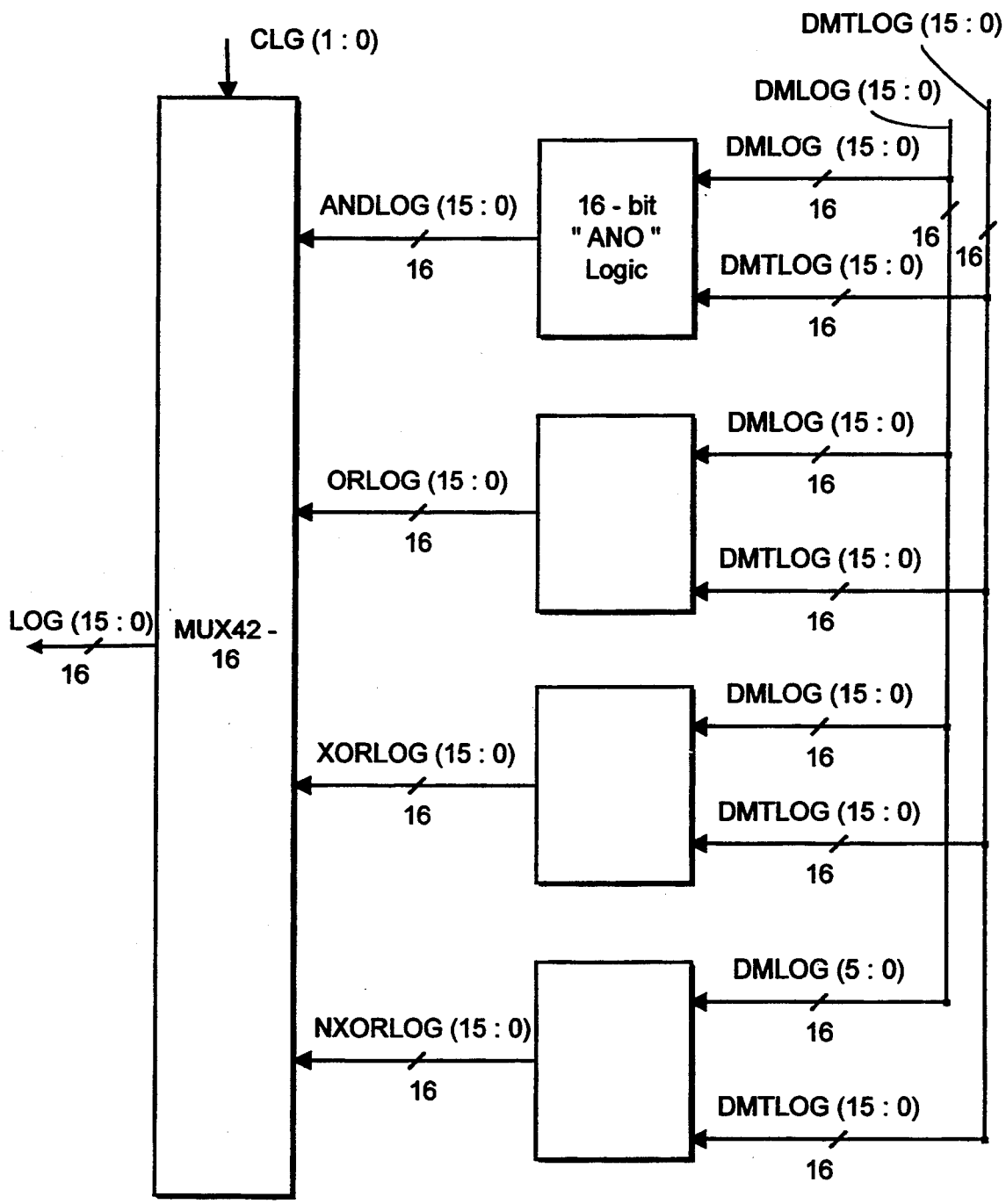
FIG. 5(b) is a schematic diagram showing the internal structure of the ALU component submodule according to the present invention.

FLOG is a 16-bit logic operation submodule which can perform logic processings of "AND", "OR", "XOR" and "XNOR" on 16-bit data, its structural constitution may be seen by referring to FIG. 5(b) which is a schematic diagram showing the internal structure of the FLOG submodule.

FMULT is a 16-bit×16-bit high speed parallel multiplier for performing high speed multiplication on 16-bit data, high speed division can also be implemented by the use of the paths of this sub-component unit.

FSU is a unique 16-bit high speed shifter, its concrete constitution and principle can be explained by an 8-bit shifter operative to perform single cycle shift of arbitrary number of bits.

Figure 5C:
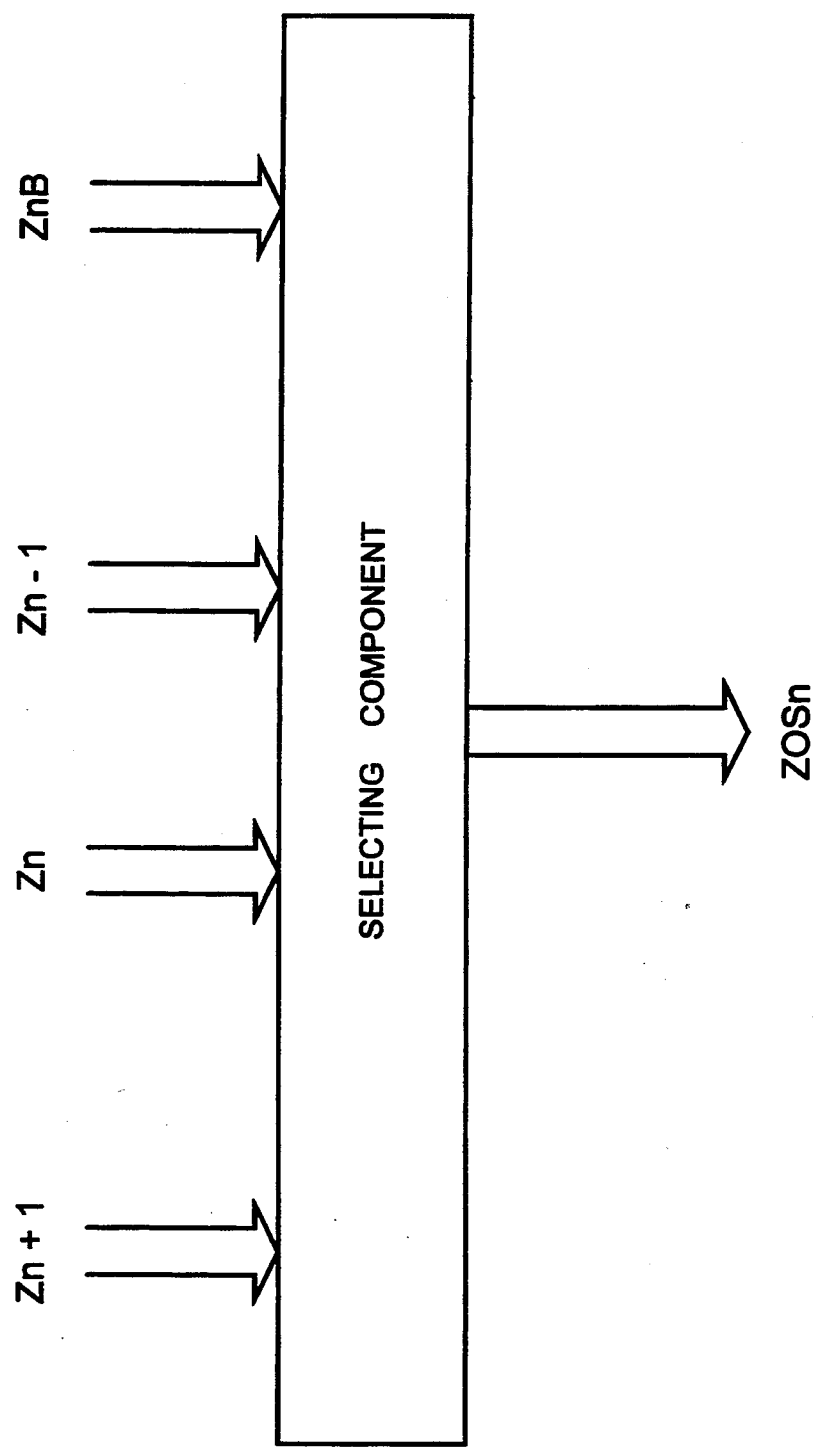
FIGS. 5(c), 5(d) and 5(e) are schematic diagrams showing the shift component in the ALU component for performing shift of arbitrary number of bits in a signal cycle.

It can be seen from the comparison of $Z_7-Z_0$ of an 8-bit data before and after various shiftings that each of the bits obtained after shifting is only the result of selection among the values of $Z_7$ through $Z_0$ and "0", this is an important basis of the shifter according to the present invention. In order to make a simple and clear description, the bit $Z_n$ is taken as an example for description, where n may be 0, 1, 2, ..., 7. FIG. 5 (c) is an illustration of the shift on $Z_n$. As shown in FIG. 5(c), this bit has a selecting component, the output Zosn represents the shift output, its inputs may have $Z_{n+1}$, $Z_n$, $Z_{n-1}$ and $Z_{nB}$. When a left shift operation is performed, Zosn=$Z_{n-1}$; when a sight shift operation is performed, Zosn=$Z_{n+1}$; in normal transmission, Zosn=$Z_n$; and in one's complement transmission, Zosn=$Z_{nB}$.

On the basis of the principle mentioned bove, a schematic diagram of a data shift selecting component in a shifting component according to the present invention can be derived as shown in FIG. 5(b). This selecting component has one output Zosn and eight inputs $Z_0$ through $Z_7$. An instruction issued by the computer is sent to the selecting component as a control signal, after decoded by a decoding component. Where the instruction mentioned here is a long or superlong instruction unique to the MISC architecture computer, the shift operation instruction only occupies a portion in the superlong instruction, the control signal selects one signal out of $Z_0$ through $Z_7$, and sends it to the output Zosn. For the eight shifting components, eight of such selecting components are needed, a shifting component for single cycle arbitrary number of bits shift is thus constituted by the combination of them.

Figure 5D:
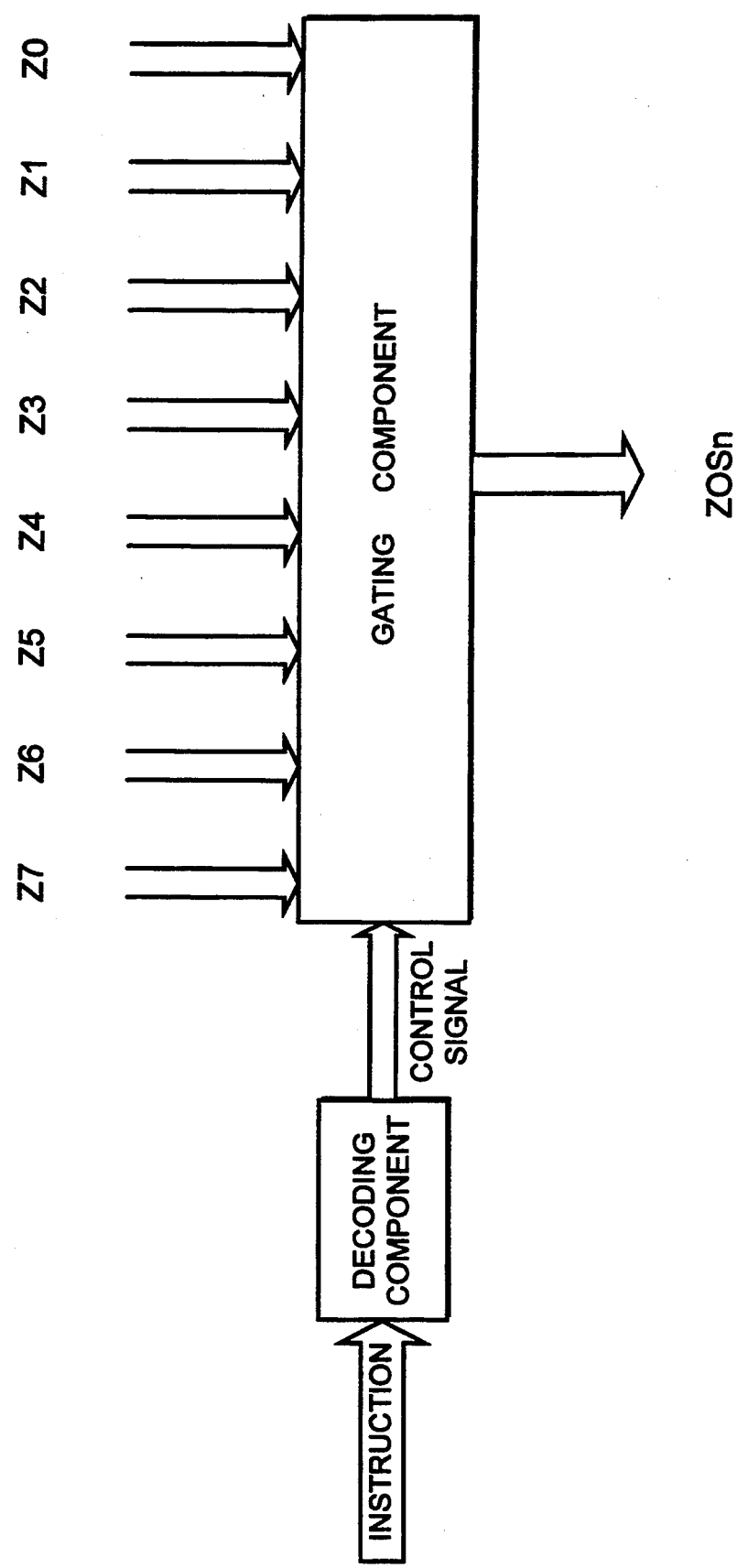
Figure 5E:
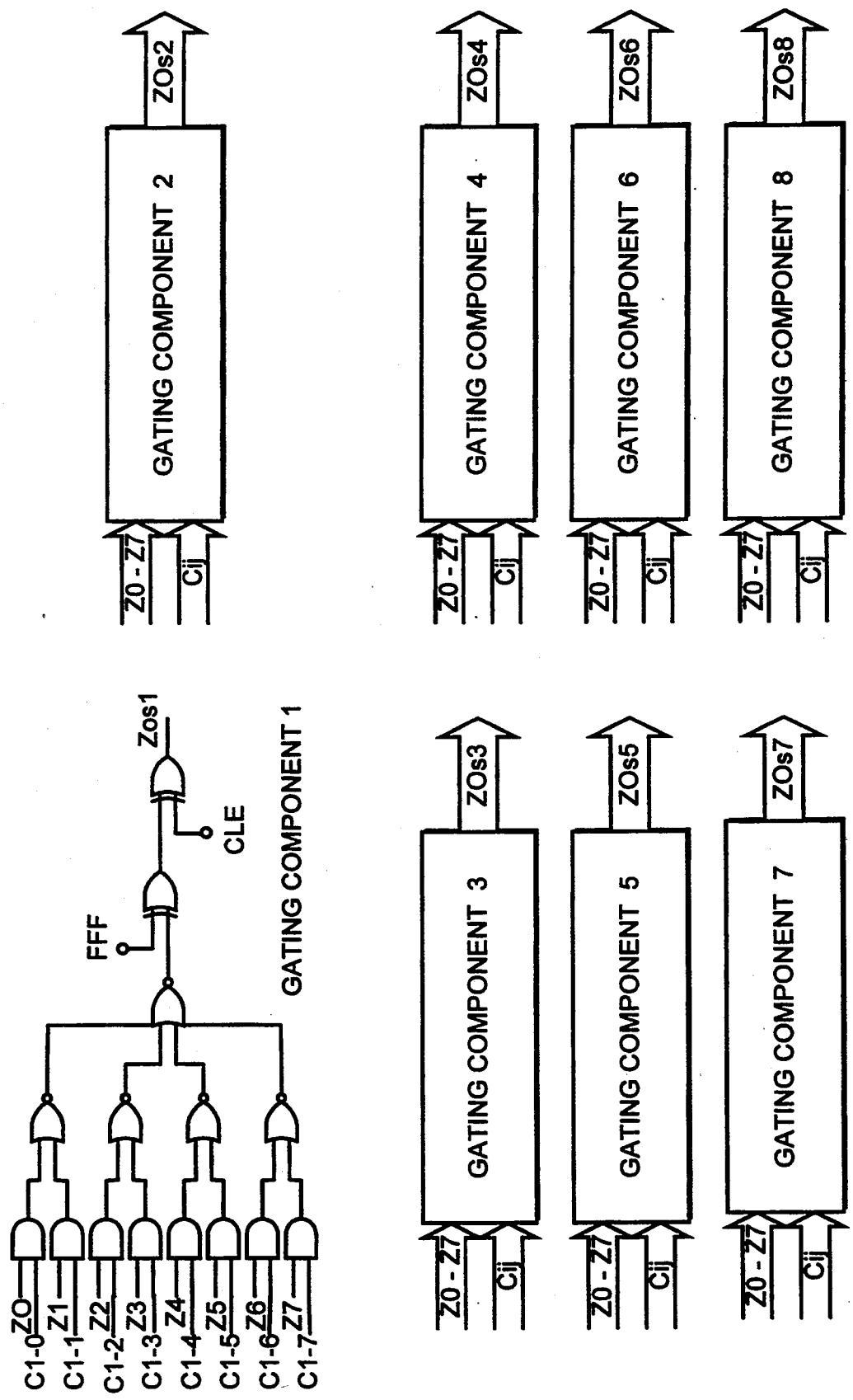

FIG. 5(e) shows an 8-bit shifting component, it consists of eight selecting components as shown in FIG. 5(d), each of the selecting components is constituted by gate circuit.

Now, description is made on the selecting component 1 shown in FIG. 5(e) as an example. $Z_0$ through $Z_7$ in the selecting component 1 are eight input bits to be shifted, while Zosl~8 are output signals after being shifted. FFF is the one's complement output signal, when it is 1 (or 0), the shifted result its original code form is output; when it is 0 (or 1), then the one's complement of the shifted result is output. CLE is a reset signal, when it is 1 (0), the output is 0; when it is 0 (or 1), the shifted result is output. $C_{1-0}$ through $C_{1-7}$ shown in FIG. 5 (e) are the shift control signals for the first selecting component, $C_{ij}$ shown in FIG. 5(e) (where i is the number of the selecting component, and $j = 0, 1, 2, \ldots, 7$) is a shift control signal for each of the selecting components, they are obtained from the decoding of the insruction. Since decoding is a common technique, it is not to be described here. It can be seen from FIG. 5(e) that the outputs Zos 1~8 of each of the selecting components can be obtained from any bit signal of $Z_0$ through $Z_7$ by selection in a clock pulse cycle, thereby, single cycle arbitrary number of bits shift operation can be implemented.

Figure 6A:
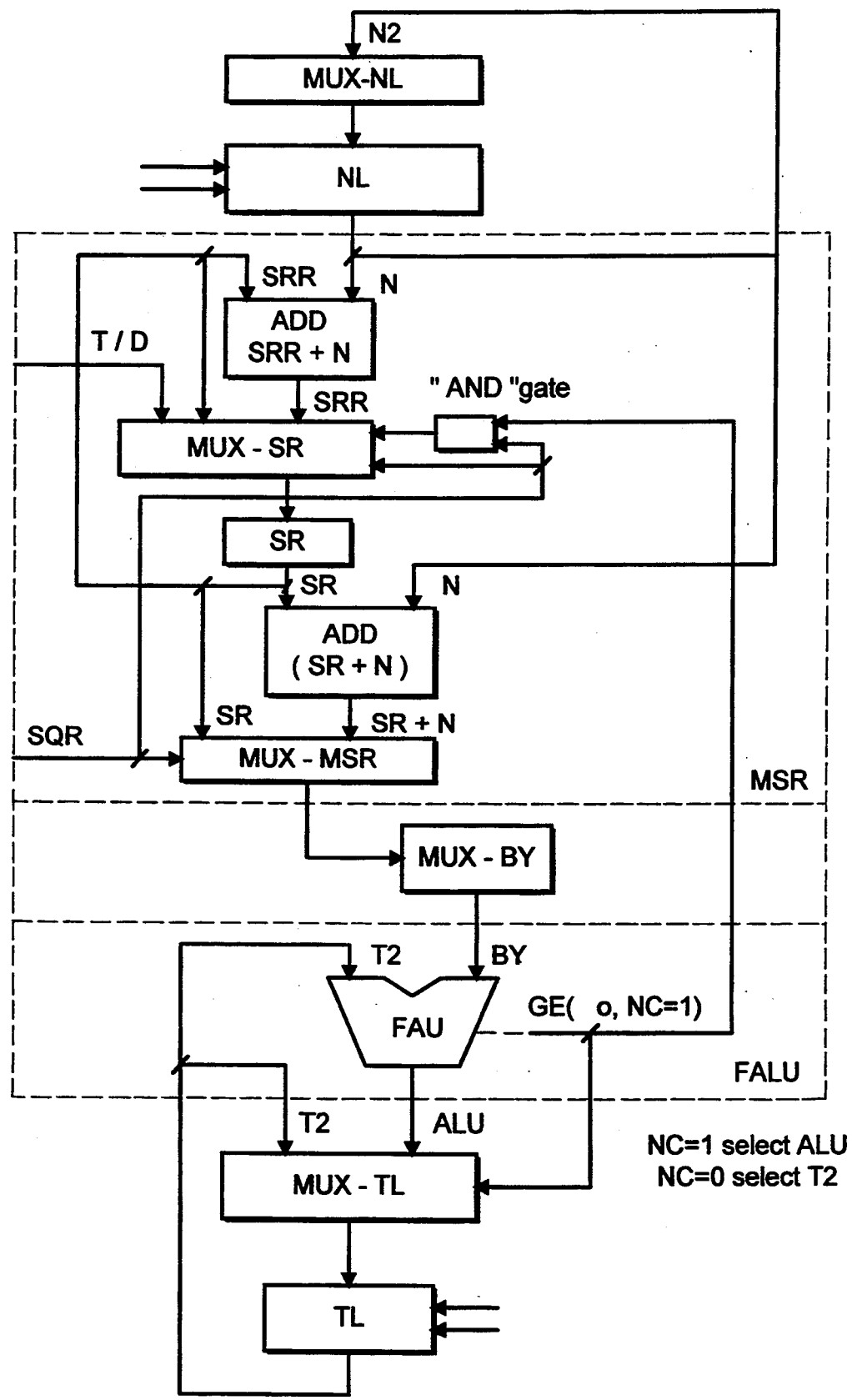
FIG. 6(a) is a schematic diagram showing the square rooting hardware according to the present invention.
Figure 6B:
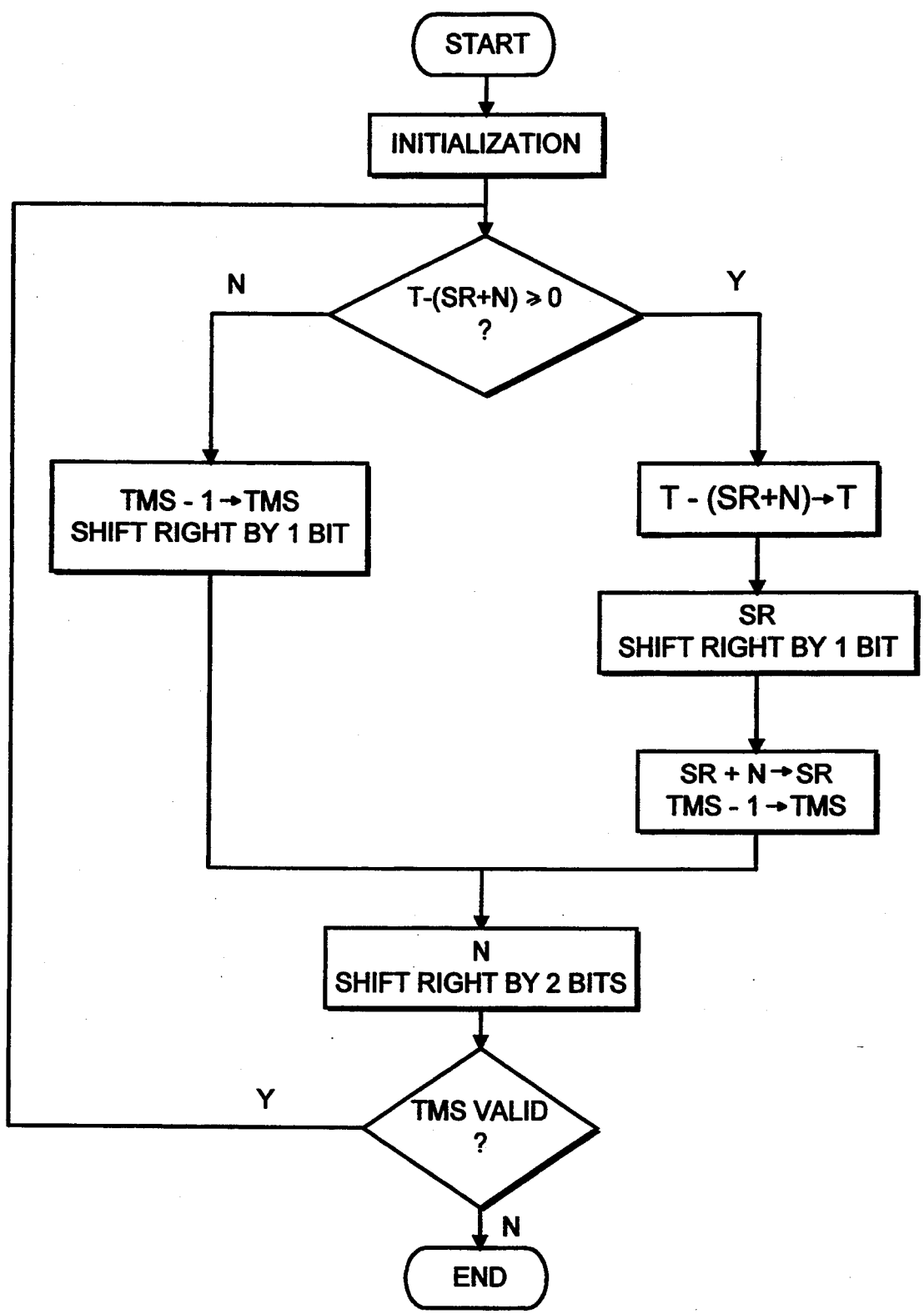
FIG. 6(b) is a flowchart showing the square rooting of an integer according to the present invention.

FIG. 6(a) shows the path structure of the square rooting hardware of the MISC architecture computer accoding to the present invention, this structure embodies the integer square rooting algorithm shown in FIG. 6(b), the integer square rooting operation of a 16-bit binary number can be fulfilled in eight system clock cycles by the control of the repeating execution of instruction, the speed of which is more than five times higher than that of the square rooting algorithm implemented by program.

Figure 7A:
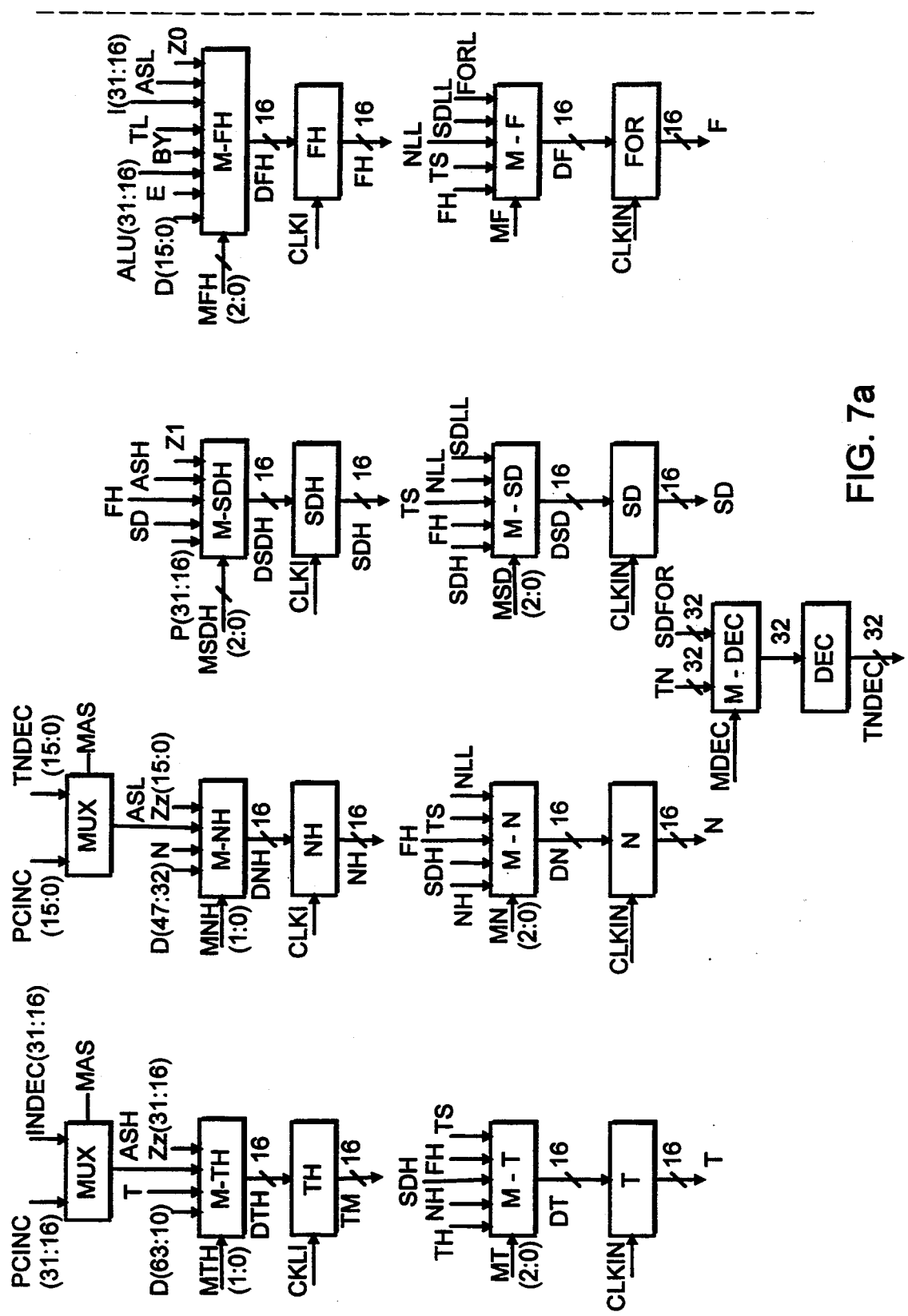
FIG. 7 is a schematic diagram showing the top of stack, next to the top of stack and the third one to the top of stack registers of the parameter stack according to the present invention.
Figure 7B:
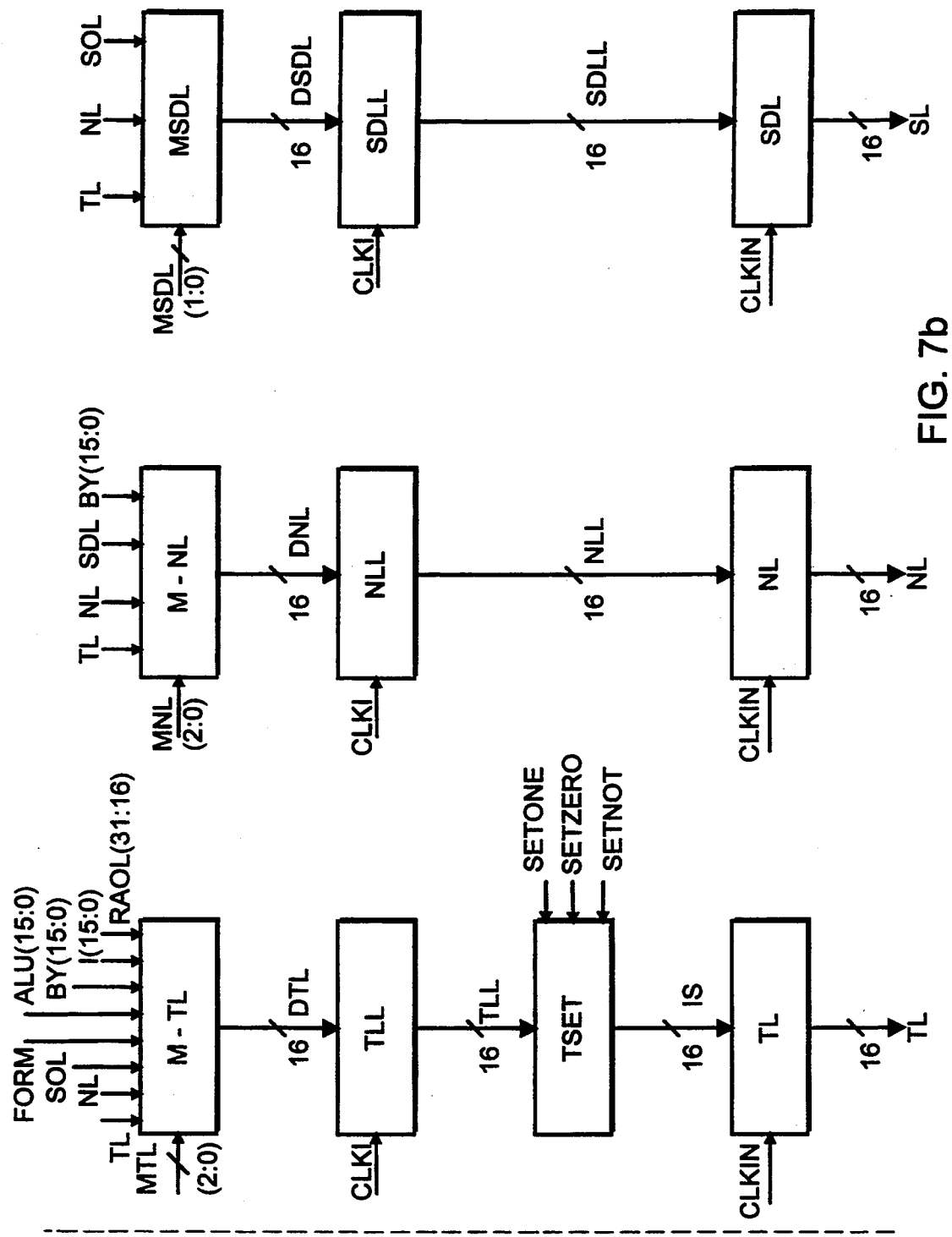

FIG. 7 shows the top of stack, next to the top of stack and the third one to the top of stack register component FIN of the MISC architecture computer according to the present invention. This component essentially comprises fourteen 16-bit registers constituted by upper and lower level latches structure, and multiplexers controlling the data paths of those registers. It furter comprises a TEST submodule for testing the status of the data of the top of stack register of the parameter stack, and decrenent data paths M-DEC and DEC (32-bit one out of two multiplexer and 32-bit decrementor) for performing successive decrement operations of address data when the parameter stack data are regarded as 32-bit addresses. Because of the adoption of the structure of repeated prereservation of registers (each of the top of stack, next to the top of stack and the third one to the top of stack registers consists of three 16-bit registers respectively, the fourth one to the top of stack register also has two 16-bit registers in the FIN module), so that the parameter stack having a memory data length of 16 bits can process address data of 32 bits, and can accommodate 64-bit data from the main memory data port at one time, thereby, sesolves the non-matching problems of 64-bit, 32-bit, 16 bit data length between the address word lengths of the return stack and address data, the data word lengths of the parameter stack and the ALU component, respectively.

Figure 8:
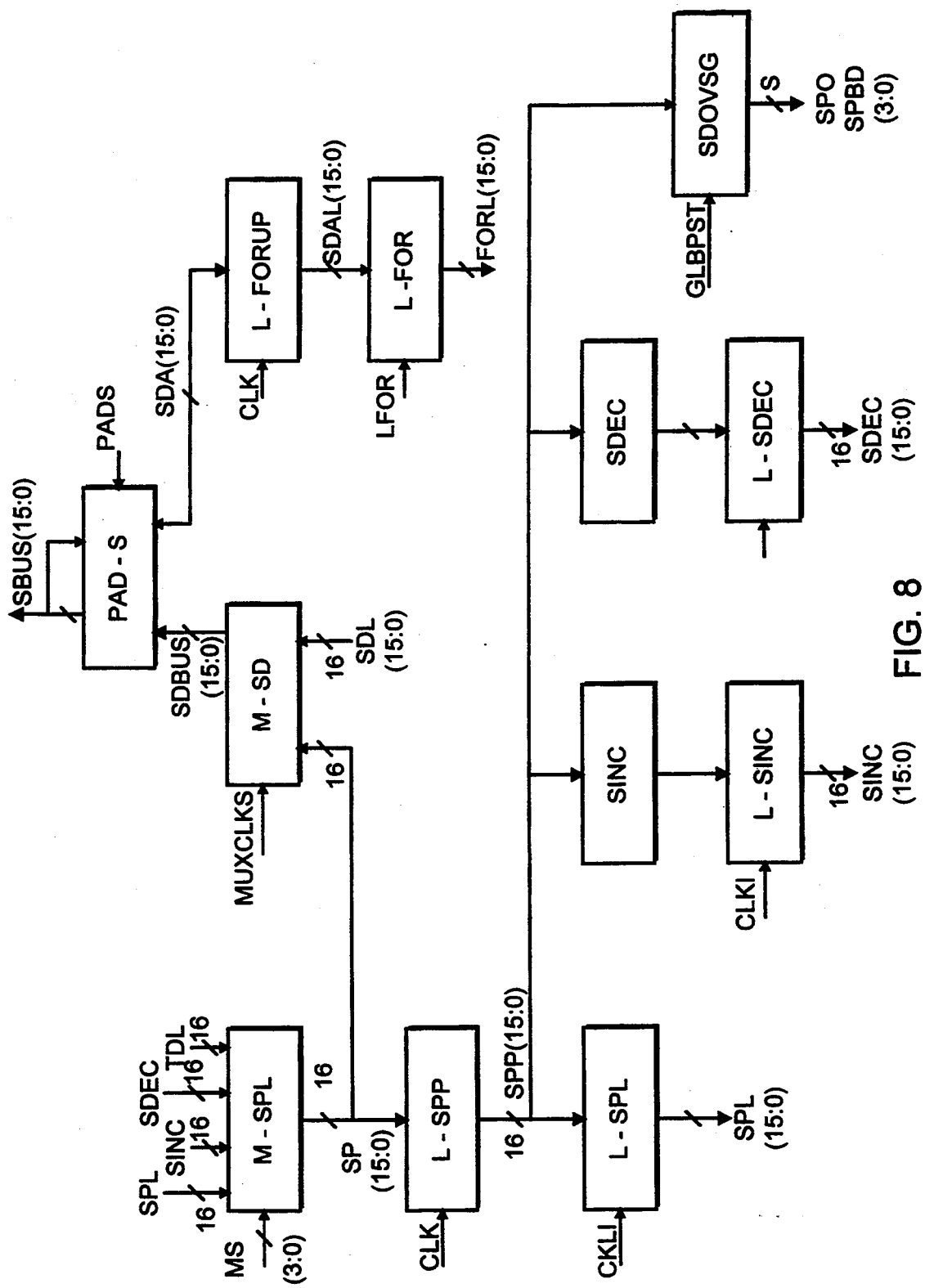
FIG. 8 is a schematic diagram showing the management component for the parameter stack memory area according to the present invention.

FIG. 8 shows the parameter stack management component of the MISC architecture computer according to the present invention, which mainly comprises: a fourth one to the top of stack register of the parameter stack, which has a structure of upper and lower latches, a pointer register for the parameter stack; current pointer adding 1 register, subtracting 1 register; an incrementor, an decrementor; parameter stack overflow hardware detection component SDOVSG, data connecting ports PAD:PAD-S between the parameter stack CPU registers and the memory area outside the CPU, and pointer selector M-SPL (16 bit one out of four multiplexer); parameter stack output bus data multiplexer M-SD (16-bit one out of two multiplexer), wherein the parameter stack pointer operates to pre-generate a current point plus 1 result and minus 1 result, such that the stack pointer for the execution operation of the next cycle can be generated by selection among the "plus 1 pointer", "minus 1 pointer" and the "current next pointer", thus, the speed of generation of the stack point can be sped up.

Figure 9:
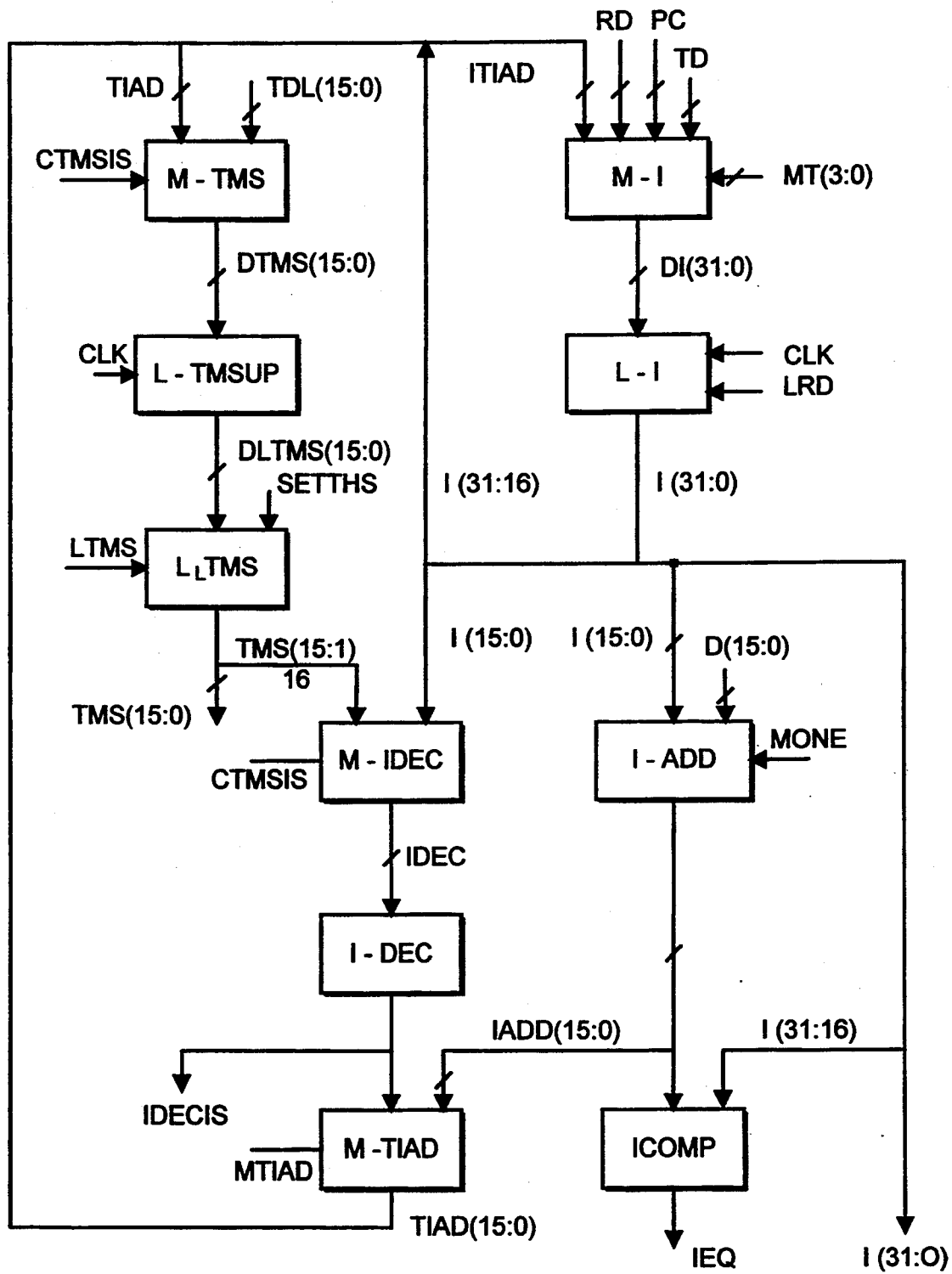
FIG. 9 is a schematic diagram showing the top of stack register of the return stack memory area and the instruction repeating execution control component according to the present invention.

FIG. 9 shows the top of stack register of the return stack and the instruction repeating execution control component, which comprises a top of stack register L-I of the return stack having the structure of upper and lower level latches, and its data multiplexer M-I (32-bit one out of four multiplexer), and an intruction repeating execution component constituted by a one out of two multiplexers M-TMS, M-IDEC, M-TIAD 16-bit latches L-TMSUP, L-TMS (these two latches constitute the register TMS), 16-bit decrementor I-DEC 16-bit incrementer I-ADD; 16-bit comparator ICOMP.

Figure 10:
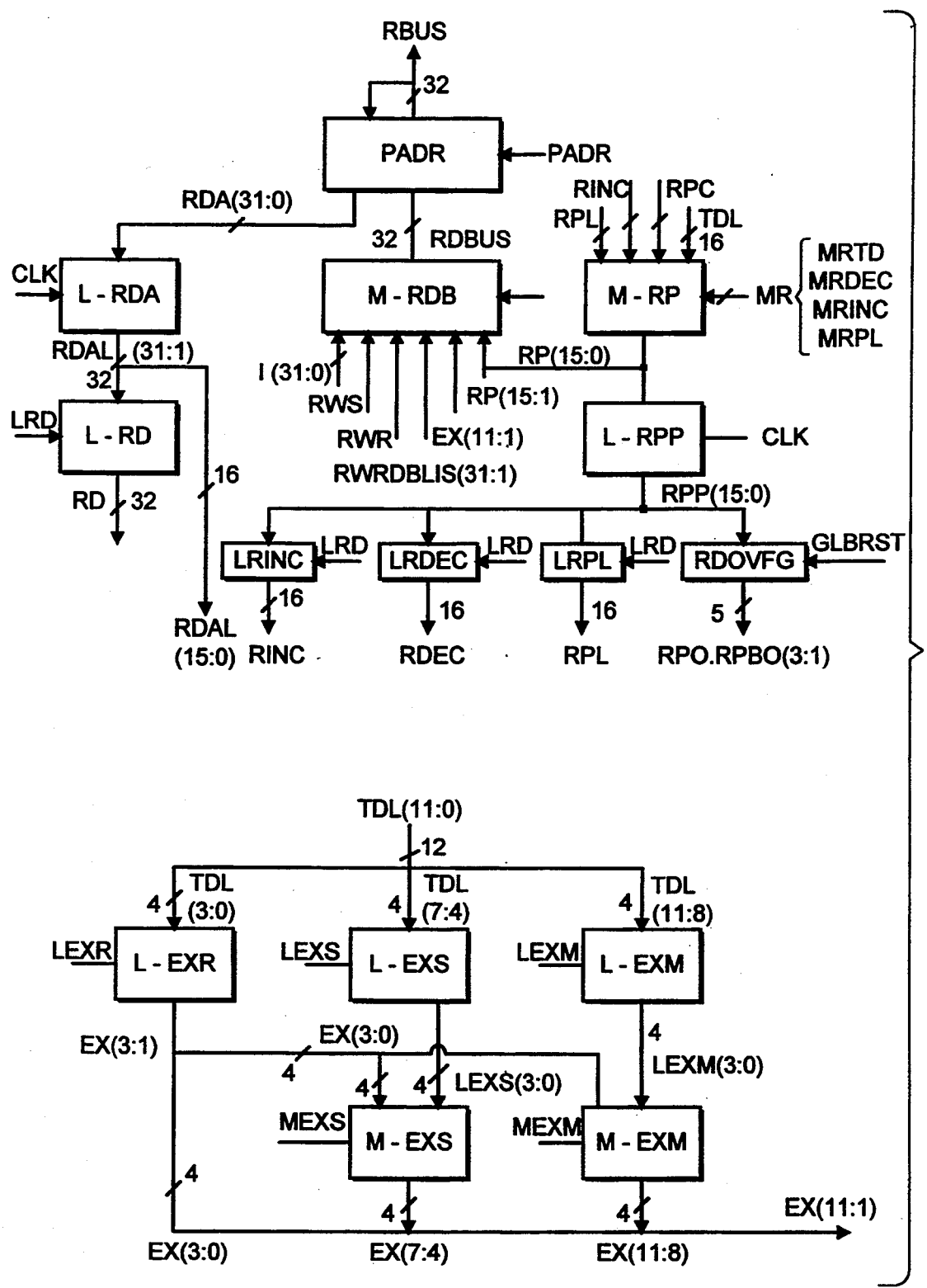
FIG. 10 is a schematic diagram showing the management component for the return stack memory area according to the present invention.

FIG. 10 shows the return stack management component of the MISC architecture computer according to the present invention, besides a return stack pointer generating and return stack next to the top of stack register component similar to the parameter stack pointer generating module shown in FIG. 8 (the only difference of the next to the top of stack register and the output/input PAD:PAD-R of the return stack from that of the parameter stack is that they are of 32-bit length), the return stack management component further comprises a expended bus register portion, this portion consists of three registers EXR, EXS and EXM for generating control signals to be output to the return stack memory area, parameter stack memory area and the main memory address decoding portion, respectively (these signals come from the current instruction and be sent to the exponded bus registers via the CPU internal bus TDL), to control the partitioned operations of the above mentioned three memory areas to provide hardware support for multi-user, multitask processings.

Figure 11:
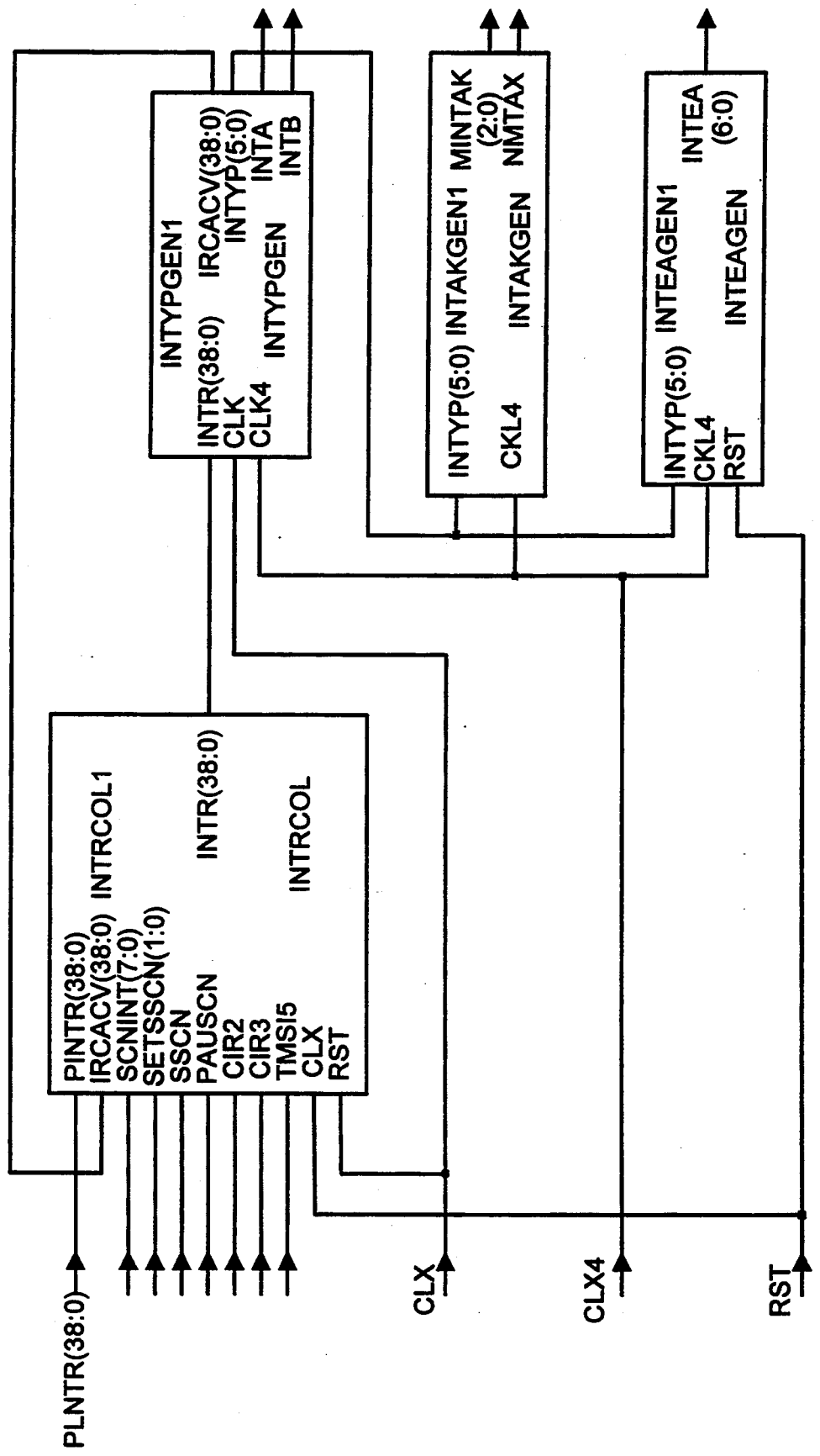
FIG. 11 is a schematic diagram showing the interrupt handling component according to the present invention.

FIG. 11 shows the interrupt handling component located in the CPU of the MISC architecture computer according to the present invention, which consists of an interrupt collection submodule INTRCOL, an interrput code generating submodule INTYPGEN, an interrupt acknowledging signal generating submodule INTAKGEN, and an interrupt vector generating submodule INTAGEN.

Figure 12A:
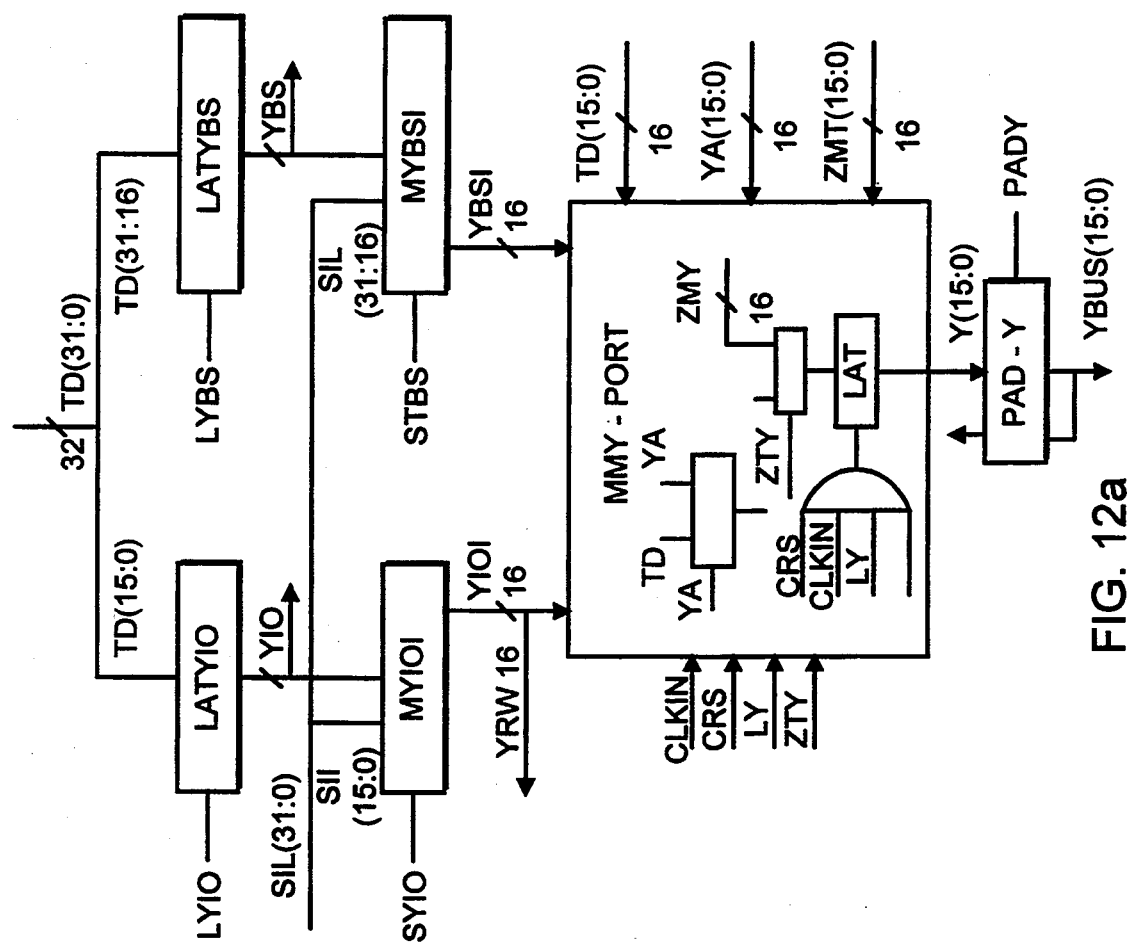
FIG. 12(a) is a schematic diagram showing the 16-bit data parallel I/O port component according to the present invention.

FIG. 12(a) shows the 16-bit parallel data I/O component of the MISC architecture computer according to the present invention, which comprises port state control registers YBS and YIO (they are registers of the structure of upper and lower level latches) and their data selectings MYBSI and MYIOI (all of them are one out of two multiplexers), and data transmission processing submodule MMY-PORT. This port has the unique state self-recovery characterie which is to be described with reference to FIGS. 12(b) and (c).

Figure 12B:
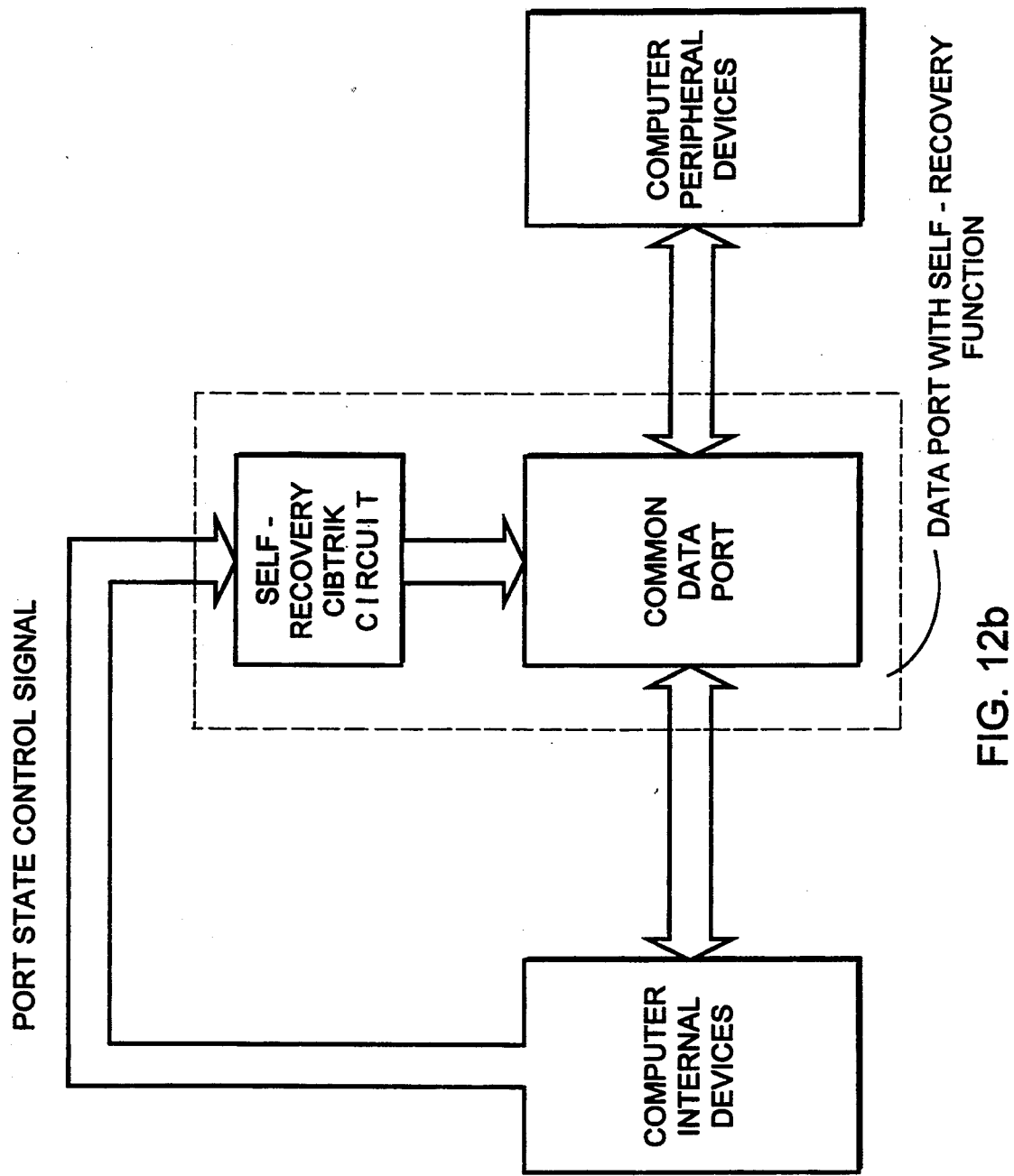
FIGS. 12(b) and 12(c) are schematic diagrams showing the data port with self-recovery function according to the present invention.

FIG. 12(b) shows the configuring and operating conditions of the data port having self-recovery function in the computer system of the present invention. It can be learnt from the drawing that the data port having self-recovery function of the present invention consists of two circuits: a common data port; and a self-recovery control circuit. In the present invention, the data bus of the internal devices of the computer is connected to the data bus of peripheral devices through the data port having self-recovery function, while the port state control signal delivered by the internal devices of the computer first passes the self-recovery control circuit, and then be sent to the common data port.

The following is a description of the principle of the self-recovery control circuit shown in FIG. 12(e), through which, the operating conditions of the data port having self-recovery function shown in FIG. 12(b) can be more clearly known.

Figure 12C:
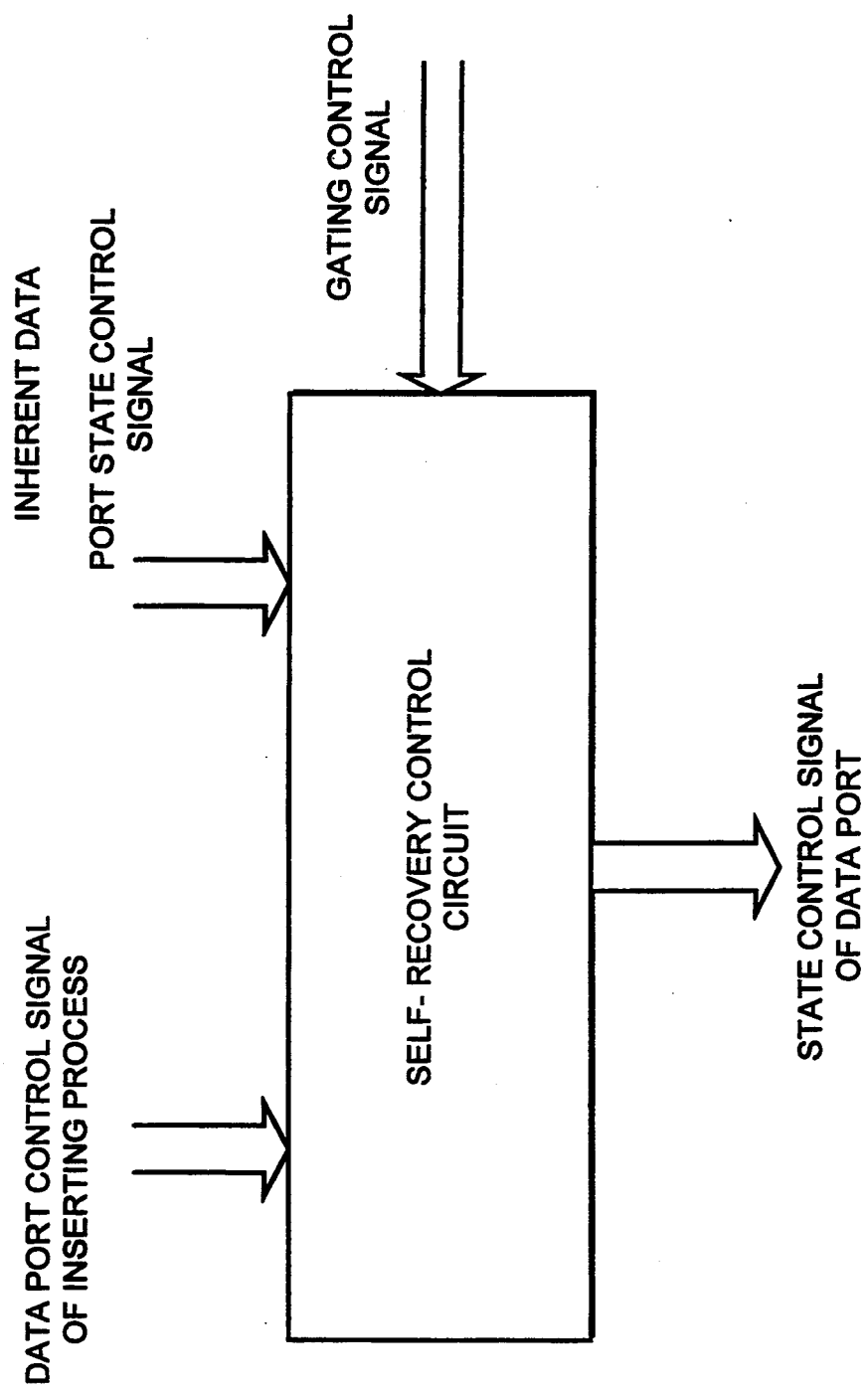

The self-recovery control circuit shown in FIG. 12(c) has three input signals and one output signal. The three input signals are: the data port state control signal of the inserting process; the inherent data port state control signal; and the gating control signal. The combination of these three input signal constitute the port state control signal shown in FIG. 2, they are all obtained from the instruction decoding of the computer. As shown in FIG. 12(c), the self-recovery control circuit of the present invention is actually a gating component, which gates the data port state control signal of the inserting process or the inherent data port state control signal under the control of the gating control signal. When the data transmission of the computer enters the operation of the inserting process, the gating control selects the data port state control signal of the inserting prcoess as the state control signal for the data port, while the inherent data port state control signal is saved in a holding means (not shown). At the completion of the inserting process, the gating control signal is changed to select the inherent data port state control signal as the state control signal for the data port, thus, achieving the purpose of self-recovery.

Figure 13:
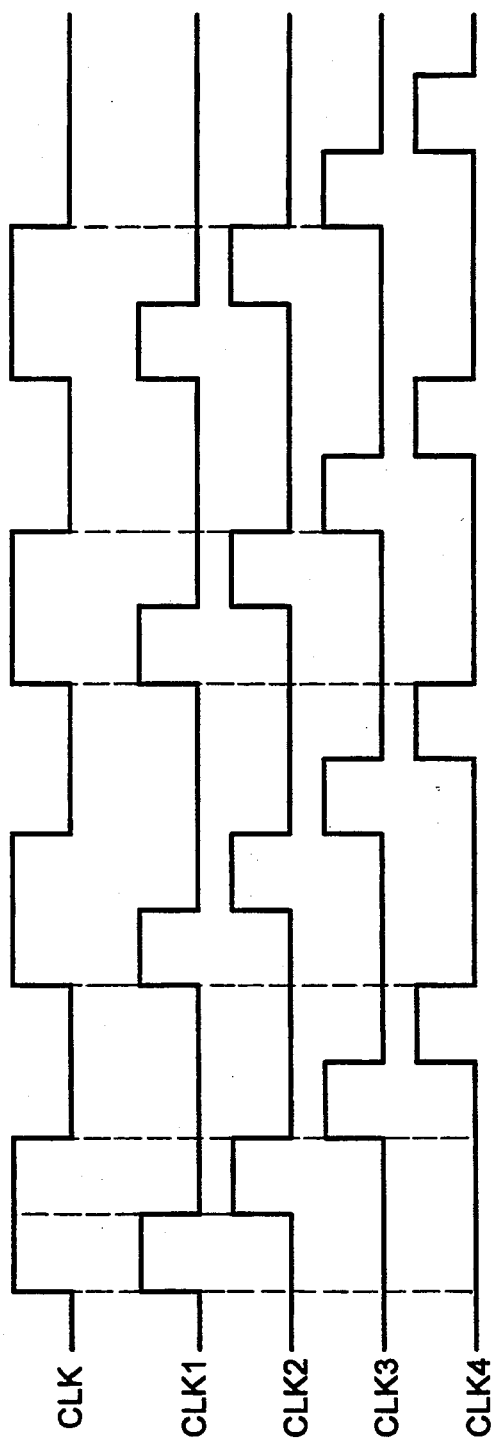
FIG. 13 s a schematic diagram showing the structure of a register consisting of an upper and a lower level latches according to the present invention.
Figure 13:
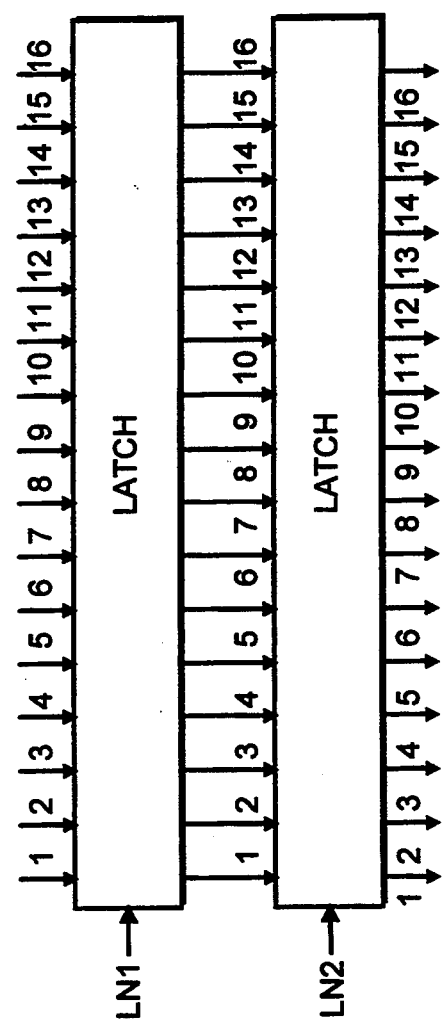

FIG. 13 depicts the time series waveforms of the system clock and time signals of the MISC architecture computer according to the present invention, and a schematic diagram of the structural constitution of the register having the structure of upper and lower level latches, wherein the signal LN1 can use the system main clock signal CLK, while LN2 can use CLK1, CLK2, CLK3 or CLK4, respectively, according to the requirement of the order of generations of the data resulted from the operation. It should be noted that the switch mechanisms of the upper and lower latches should be different, that is to say, if the upper latch adopts the mechanism of "high level turn-on and low level turn-off", then the lower latch has to adopt the mechanism of "low level turn-on and high level turn-off", and vice versa. The purpose of this requirement is to ensure the upper and the lower latches of the register never turn-on at the same time to guarantee reliable data read from and write to the register. The functions of the dual-latch are: input and output of the register can be performed simultaneously, or input preceding output and output preceding input, and damaging write-in as well as non-damaging write-in can be performed under the control of two latching switch signals. Thus, at the same time of saving the data in the register, other processings on the data can be processed to obtain the result of processing beforehand, when this result is needed, it can be selected by the multiplexer, thereby, the processing speed of data is accelerated. Such application of the dual-latch of upper and lower levels and multiplexer is one of the important characteristics of the MISC architecture computer according to the present invention.

Another function of the system clock CLK and time signals CLK1, CLK2, CLK3, CLK4 is that the MISC architecture computer according to the present invention has implemented non-time-series control mode. In contrast to the time series control of conventional computers, the present invention has implemented non-time-series control mode. The combinatorial logic control component of conventional computers comprises three portions: instruction decoding portion; time series generator; and combinatorial logic decoding circuit. The combinatiorial logic decoding circuit responsive to the time series signal of the time series generator, synthesizes the requirement of the current instruction and the state feedback control signal, and finally generates a series of micro-operation control signals to control each of the components to perform various operations prescribed by the instruction. Here, each of the instructions comprises multiple CPU cycles, while each CPU cycle includes multiple time pulse signals. The combinatorial logic decoding circuit is operative to arrange the micro-operation control signals of parallel actions in single time pulse, instead of arranging ordered micro-operation control signals in different time pulses.

The combinatorial decoding logic in the architecture of the present invention does not require the time series generator mentioned above, alternatively, it generates two small clock control signals for each single clock pulses through delaying and decoding, and the ordered micro-operations are controlled by these two clock pulses, while the majority of operations are arranged to be performed in non-time series mode in the design of the data paths and components. Even though the internal micro-operation may not avoid ordered operations, but it is the time series in one clock cycle, which is different from the concept of time series generator. In this sense, that is, the performing of relevant ordered micro-operation in a single clock cycle, it can be regarded that non-time-series control has been implemented.

Figure 14:
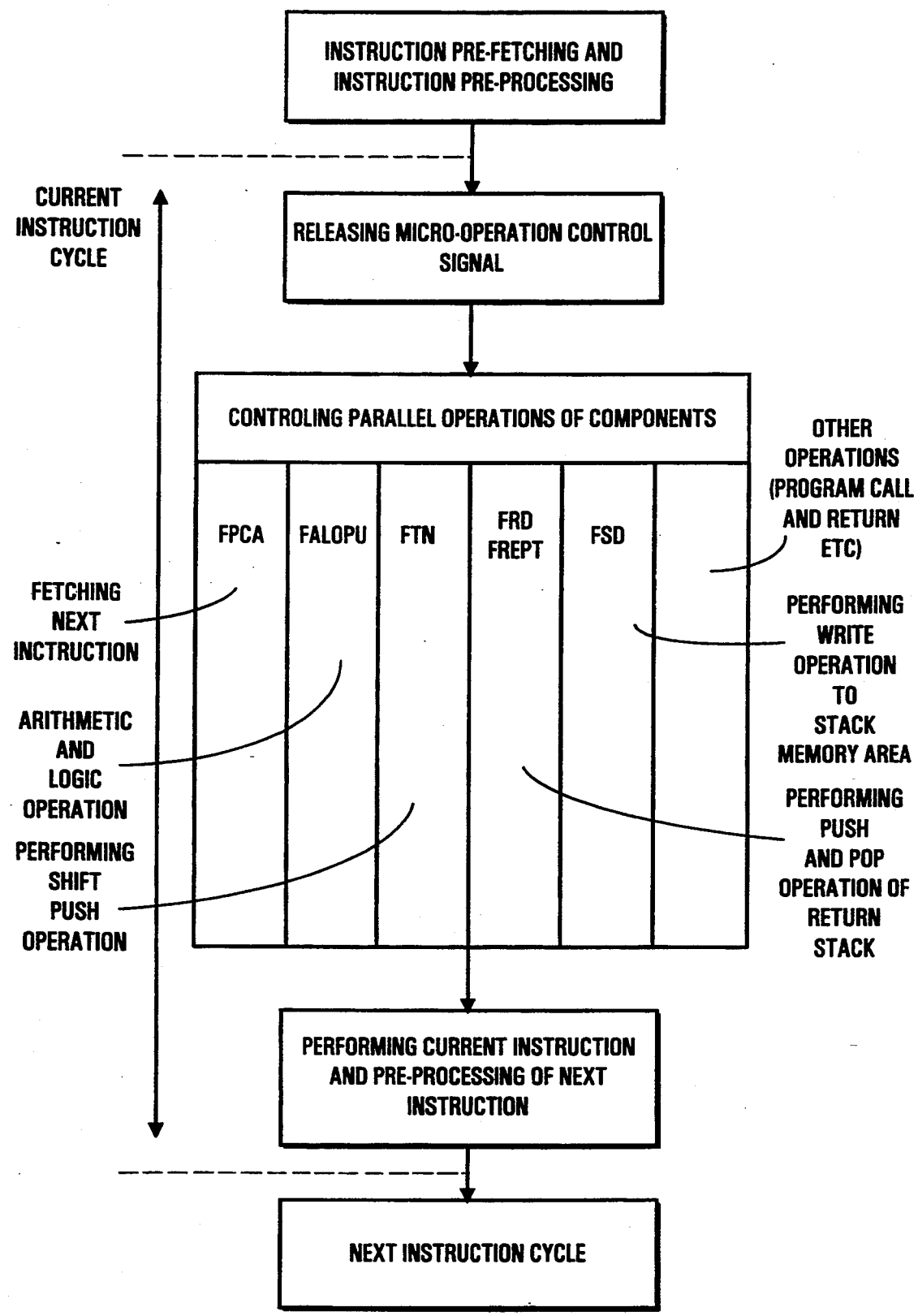
FIG. 14 is a schematic diagram showing the instruction processing flow according to the present invention.

FIG. 14 is a schematic diagram showing the instruction processing flow of the MISC architecture computer according to the present invention. Similar to the processing flow of conventional computers, the instruction pre-processing technique is also adopted by the MISC architecture computer according to the present invention. The pre-fetching and pre-processing of an instruction have been done prior to the current instruction cycle, i.e., in the previous instruction cycle. The actions are: fetching the instruction to be processed in the current instruction cycle from the main memory; performing decoding processing; and storing it into the instruction register in the CPU. The MISC architecture computer also has its own characteristics in the pre-processing of instruction and the executing procedures of the actions of loading, latching and opening of the instruction register. The data length of the instruction register of the MISC architecture computer is longer than the length of the format of each of the instructions (the length of the instruction format of the embodiment in the specification of the present patent application is 64 bits in length), its length is the total length of all the micro-code data for controlling various functional sub-modules in the CPU, the control micro-codes generated after the predecoding of each instruction do not fully fill the instruction register, this requires the instruction register fields corresponding to the micro-control code generated by decoding the current instruction to be controlled to be opened to load the code value in the instruction pre-processing procedure, and the other register fields irrelevant to the current instruction to be latched; while in the decoding of the micro-operation control signals in the current instruction cycle, only the micro-operation control signals involved in the current instruction are released, thus the effective control bits of the instruction register are different for different instructions. In a macro view, it looks like the effective micro-controls are floating in the whole instruction register, we refers it as "floating of instruction fields". After the micro-operation control signals are released, they control the parallel operations of corresponding functional submodules (the FPLA, FALOPU, FTN, FRD, FSD and etc. Submodules as shown in FIG. 14) to generate the processing results required by this instruction, while the submodules not involved in the current micro-operation controls are rendered in null operation state. At the same time of performing the processings required by the instruction of the current cycle in the current instruction cycle, the pre-fetching and pre-processing operation of the next cycle instruction should also be performed, and after the completion of the above operations, the processing procedure of the next instruction cycle is entered.

Figure 15A:
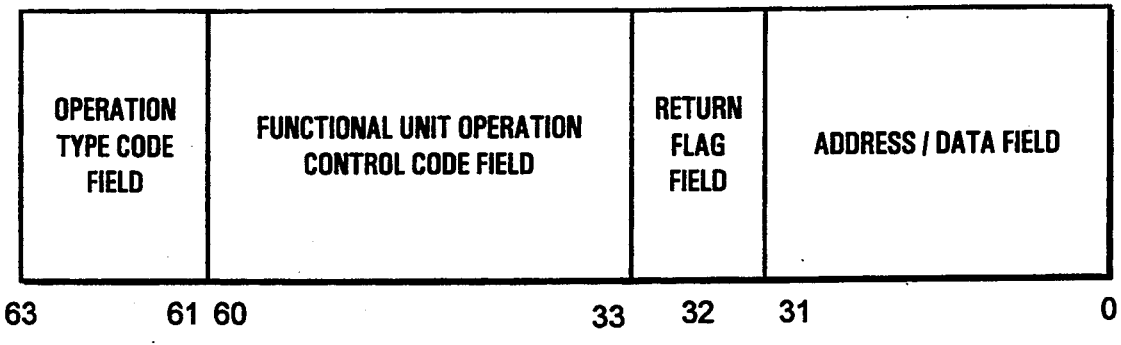
FIG. 15(a) is a distribution diagram of the instruction field format of an instruction in the instruction system according to the present invention.

The following is a description of the instruction system of the MISC architecture computer according to the present invention with reference to FIGS. 15(a), (b) and (c).

The instruction system of the present invention can implement the single cycle zero overhead design of program structure call and return operations, the so called "zero overhead" refers to that certain operations do not particularly occupy machine cycle, that is, these operations do not require additional time as viewed from their external characteristics, we refer this characteristic as zero overhead. In fact, this is the external appearance of combinational parallel processing of one operation with another. For example, in the MISC system, the program sructure call and return operations are performed by combinational processings with the arithmetic operations. We only emphasize the zero overhead characteristic of the program structure operations rather than that of the arithmetic operations. This is because the arithmetic operation is a basic function internal to the CPU, while program call and return involve the main memory and external bus.

Under the MISC instruction format, the conditional branching IF ... ELSE ... THEN, fixed loops DO .. . LOOP, DO ... +LOOP, and FOR ... NEXT, indefinite loop BEGIN ... WHILE ... REPEAT; and program structure call and return operation processings of subprogram and function calls CALL ... RETURN have all realized zero overhead design.

The language reserved words used here are all words of the FORTH language. For details of the FORTH language, please refer to specific books.

FIG. 15(a) shows the distribution diagram of the field format of MISC instructions, the operation type code field (63:61) is set to the program structure operation type code while performing program structure operation; the address/data field (31:0) is filled with the entry address of the program structure processing; the functional unit operation control dode field (60:33) is also set with the code of a part of the subsequent operations obtained from optimized compiling in addition to the setting of specific action of the required multiple punction unit corresponding to the program structure processing, such that the CPU is enabled to process program structure call and the subsequent operation parallelly, thereby, in the external appearance, the program structure call is of the zero overhead characteristic. The structure return flag code field (32) is set to a return flag in accordance with whether a program structure operation and the requirement of the subsequent program have been completed. When this flag is enabled, the code of this field conrols the corresponding component in the CPU to perform combinational structure return and other succeeding operations parallelly, making the program structure return appear zero overhead characteristic.

The instruction system of the present invention can also implement single cycle completion of LOAD/STORE operation for mixed word lengths.

Figure 15B:
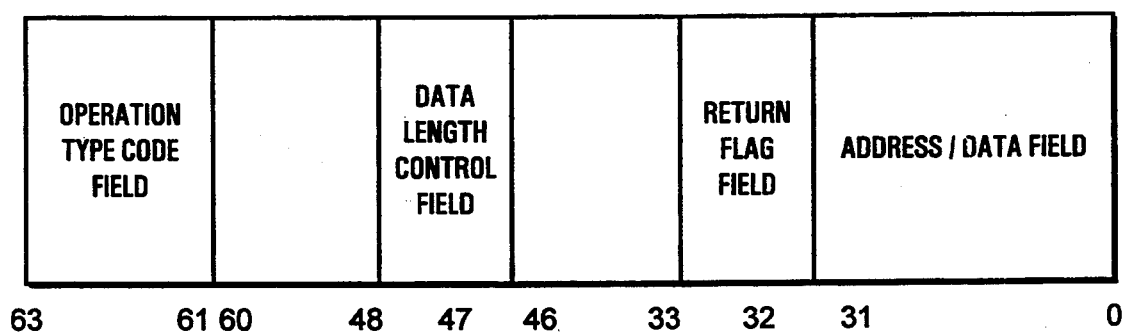
FIG. 15(b) shows another embodiment of the instruction shown in FIG. 15(a)

In the MISC architecture computers, the CPU exchanges data with the main memory using LOAD/STORE manner. The instruction format shown in FIG. 15 (b) is the same as that shown in FIG. 15(a), except that a data length control subfield is provided in the functional unit operation control field (60:33) at bits (47:46). In the performing of LOAD/STORE operations, the operation type code field (63:61) is set to the instruction code corresponding to LOAD/STORE, the return flag field (32) and other functional unit control fields (60:48, 45:33) are set to corresponding CPU internal operation codes; the address/data field (31:6) is filled with the data to be loaded. It differs from the LOAD/STORE processing of fixed data length in that: the different codes of the data length control field (47:46) correspond to the LOAD/STORE operations of four groups of 8-bit data, two groups of 16-bit data, two groups of 8-bit data and one group of 16-bit data, and one group of 32-bit data respectively. We call it LOAD/STORE of mixed word lengths. Similar to other instructions of the MISC instruction system, the LOAD/STORE instruction also has the characteristic of completion in one single clock cycle.

The instruction system of the present invention can implement the characteristic of programmable operation sequences.

The so called programmable operation sequence refers to that: for various compatations consisting of multiple different sequences of certain operators can be conveniently implemented only by giving different corresponding codes to the data flow control field of the instruction system, this is because of certain arrangements in the circuit structure.

For example (the following examples of program are given in the FORTH language, where A, B and C are three operands, "*" represents multiplication; "←" represents shift to the left by one bit, shift to the left by one bit in binary numbers is equivalent to multiplied by 2; "NOT" represents logic negation, the details of grammar and semantics of the FORTH language can be found in relevant books):

ABC*←NOT+and ABC+NOT←* are two program segments having the same operators and operands, however, they are two different computation because of the different orders of the operators, the meaning ABC*←NOT+ can be expressed by the arithmetic and logic relation of: $\overline{(B*C)*2}+A$; while the meaning of ABC+NOT←* is: $\overline{(B+C)}*2*A$. In the conventional architecture computers, these two program segments have to be implemented step by step with instruction flows of different orders. Nevertheless, in our computer with data flow as its architecture characteristic, the above mentioned two operations can be implemented by two instructions with different data flow control fields.

The essence of the data flow control field is: giving different codes to different paths through which data flow among the multiple function units inside the computer, thereby, controlling the order in which data flow through multiple function units and the direction of the data flow, so as to obtain the proper result of computation required by the program.

This structure renders the combinational operation based on the primitive operations of arithmetic operations addition, subtraction, multiplication, division, shift, etc., and logic operations "AND", "OR", "NOT", etc. to be controlled and implemented simply and conveniently by different codings of the instruction's multiple function field and the data flow control field.

The ALU component in the architecture according to the present invention comprises four basic operation components, i.e. addition and subtraction component, multiplication and division component, shift operation component, and logic operation component, and input gating components for each of the operation components and output gating components for the results generated, wherein, each of the basic operation components can perform respective addition, subtraction, multiplication, division, shift, basic logic operations, etc. independently, while the input gating components for each of the operation components generate the operation right for each of the operation components, their data sources include the results of each of the operation components and operand data from the external ports of certain components. The output gating component selects and generates the final result data from the results of each of the basic operation components.

Figure 15C:
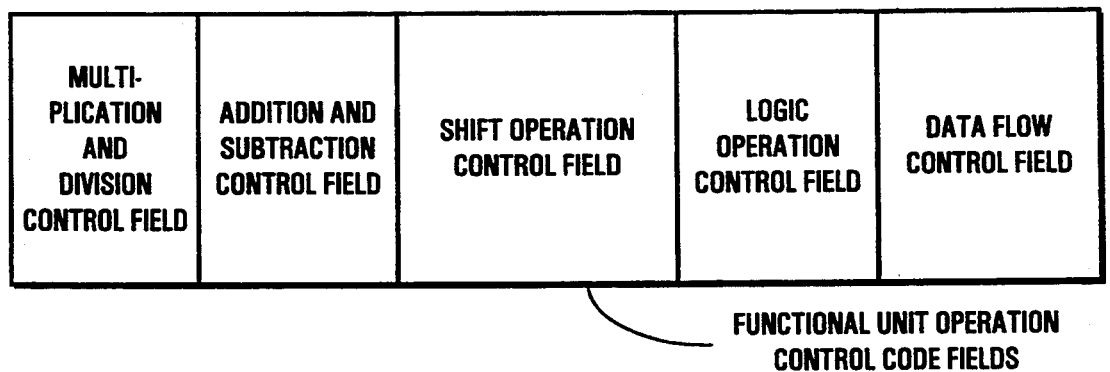
FIG. 15(c) is a schematic diagram showing the constitution of the operation related instruction field of an instruction with programmable performing operation requence according to the present invention.

Each of the operation components is given the control code of the currently required operation by the corresponding field in the super-long instruction format. Refer to FIG. 15(c) for the constitution of the instruction field associated with operation, (here, only a general schematic description is given, the specific constitution of instruction may be different, but the principles are all the same), for example, the meanings of each of the fields of the instruction for ABC* NOT+ are as follows: the multiplication and division control field gives the control code for multiplication, the addition and subtraction control field gives the control code for addition, the shift operation control field gives the control code for shift to the left by one bit, and the logic operation control field gives the control code for negation operation; while the coding of the data flow control field is such that the data flow procedure should be: the inputs of the multiplication and division component select B and C as operands, the inputs of the addition and subtraction component select A and the result of the logic operation component as operands; the shift operation component takes the result of the shift operation component as operand; while the output gating component selects the result of the addition and subtraction component as the outputting final result, thus, after a period of time the correct result of operation of the stable computation indicated by ABC*←NOT+ can be obtained.

The control code portion of each of the operation control fields for ABC+NOT ←* is the same as that for ABC*←NOT+, only the codings given by the data flow control field are different, such that the data flow procedure becomes: the multiplication and division component takes A and the result of the shift operation component as operands; the addition and subtraction component takes B and C as operands; the shift operation component takes the result of the logic operation component as operand; the logic operation component takes the result of the addition and subtraction component as operand, while the final result selects the result of the multiplication and division component, after a period of time, the correct and stable computation result indicated by ABC+NOT←* can be obtained.

What is claimed is:

1. A macro-instruction set computer achictecture comprising:

main memory means for storing system softwares of the computer, instructions and user programs;

first memory means for storing preparatory data for operation, intermediate results of operation and final results of completed operation, and operating in the form of a stack;

second memory means for storing a break point address of subprograms and address for recovery of a break point while returning from call, and operating in the form of a stack; and a CPU comprising:

address management means for said main memory means, for forming the address for accessing said main memory means, which comprises a plurality of registers;

main memory means data port for receiving instructions or data from said main memory means and writing data of the CPU into said main memory means, which comprises a plurality of registers;

control logic combinational decoding means for decoding the instructions from said main memory means, and generating control signals for controlling the operation of the computer;

ALU means for performing arithmetic and logic operation functions, which comprises a plurality of registers;

data path focus means;

square rooting means operative to directly perform hardware square rooting operation;

top of stack, next to the top of stack, and a third one to the top of stack register means of said first memory means, which comprises a plurality of registers;

top of stack register and instruction repeating execution control means of said second memory means, which comprises a plurality of registers;

first management means for said first memory means, for performing the write-in and read-out operation of said first memory means in response to the microoperation control signal generated by instruction decoding, it comprises a plurality of registers;

second management means for said second memory means for performing the write-in and read-out operation of said second memory means in response to the microoperation control signal generated by instruction decoding, which comprises a plurality of registers;

system clock signal and time control signal generating means;

interrupt handling means, which comprises a plurality of registers;

parallel data I/O port, which comprises a plurality of registers;

serial-parallel data converting I/O port, which comprises a plurality of registers;

wherein, a data bus and address bus between said main memory and CPU employ wide bus structure;

data path focus means collects together the data of each of the registers in said second memory means, said interrupt handling means, said top of stack register and instruction repeating execution control means of said second memory means, said serial-parallel data converting port, said parallel data I/O port, said top of stack, next to the top of stack and the third one to the top of stack register means of said first memory means, said ALU means, said main memory data port, and said address management means of said main memory means, and selects one path of data therefrom under the control of said control signal generated by instruction decoding to be sent to said ALU means to take part in operation, such that the contents of each of all the registers inside the CPU can all take part in arithmetic and logic operations;

said top of stack, next to the top of stack and the third one to the top of stack registers of said first memory means are the memory stack and data processing cells located in the CPU, which are also important paths for each of the register data in the CPU, said data path focus means selects one path of data to be input to said ALU means, and after operation processing, the result is sent to said top of stack, next to the top of stack and the third one to the top of stack register means of said first memory means, while this path of data may also be sent directly to said top of stack, next to top of stack and the third one to the top of stack register means of said first memory means without operation processing, and then diverged to each of the means inside the CPU or sent to peripheral devices via said serialparallel data converting I/O port and said parallel I/O port thereby, the data transmission paths between each of the registers inside the CPU as well as between the CPU internal registers and the peripheral devices are linked up.

2. The architecture according to claim 1, wherein said registers are constituted by dual latches, said dual latches comprise an upper level latch and a lower level latch, both of them receive signals generated by said system clock signal and time control signal generating means, such that said upper level latch is turned-on at high level and turned-off at low level, while said lower level latch is turned-on at low level and turned-off at high level, and vice versa, such that said upper and lower level latches are never turned-on at the same time, thereby, the input and output of the registers can be performed simultaneously, or output preceded by input and input preceded by output can be achieved.

3. The achitecture according to claim 2, wherein said ALU means comprises a shift component, said shift comprises a plurality of selecting components, the number of selecting components equals to the number of bits of the data to be shifted; each of said selecting components has an output bit, said output bit corresponds to a certain bit of the data to be shifted; each of said selecting components has a plurality of input bits, the number of bits of said input bits corresponds to the number of bits of the data to be shifted, each bit of the data to be shifted corresponds to a corresponding bit of the input bits of each of the selecting components; said shift component further comprises a decoding component, which decodes the signal portion relating to shift operation in the computer instruction, thereby, generates the shift control signal for each of the selecting components, said shift control signal is connected to the control signal input of said selecting component, said shift component can perform shift operation of arbitrary number of bits on the data to be shifted under the control of this signal.

4. The architecture according to claim 3, characterized in that the number of said selecting components equals to eight, to facilitate shift operation of arbitrary number of bits on 8-bit data.

5. The architecture according to claim 4, characterized in that the number of said selecting components equals to sixteen, to facilitate shift operation of arbitrary number of bits on 16-bit data.

6. The architecture according to claim 5, wherein the parallel I/O port is a data port having self-recovery function, said data port having self-recovery function comprises a common data port, the internal data bus of said CPU is connected to the peripheral devices of the CPU through said common data port, said data port having self-recovery function is characterized in that it comprises a self-recovery control circuit, said self-recovery control circuit receives three paths of signals generated by decoding of the computer instruction: data port state control signal of an inserting process, inherent data port state control signal and a gating signal, under the control of said gating signal, said self-recovery control circuit is operative to send one of said two paths of state control signals to said common data port, such that the change and recovery of the state of the data port can be performed by occupying only one cycle, thereby, to form a general purpose multifunction data port.

7. The architecture according to claim 6, wherein said self-recovery control circuit comprises a plurality of gating components, each of said gating components receives a data port state signal of said inserting process and a said inherent data port state signal, said gating component further receives a pair of complementary gating signals, thereby, selects one out of said two signals as state control signal for said common port.

8. The architecture according to claim 7, wherein the characteristics of the instructions employed are: the instruction fields of the instructions comprises operation type code field, functional unit operation control code field, return flag field and address/data field, wherein the operation type code field is set to the operation type code of the program structure; the address-/data field is filled with the entry address of the program structure processing; the functional unit operation control code field is set to the code corresponding specific action of each of the functional units required by the program structure processing and part of the subsequent operation obtained from optimized compilation, enabling the CPU to process program structure call and subsequent operation in parallel; thereby, the program structure call has the characteristic of zero overhead in its external appearance; the return flag code field is set to a flag indicating return or not return respectively based on whether the program structure operation has been completed and the requirement of the subsequent program, when this flag is enabled, the code in said return flag code field controls the appropriate components in the CPU to perform the structure return and other subsequent operations in parallel and combinational made, such that the program structure return appears the characteristic of zero overhead.

9. The architecture according to claim 8, wherein the word length of an instruction is 64 bits; bit 0 through bit 31 of the instruction is the address/data field; bit 32 of the instruction is the return flag field; bit 33 through bit 60 of the instruction is the functional unit operation control code field; bit 61 through bit 63 of the instruction is the operation type code field.

10. The architecture according to claim 9, wherein the data exchange performed between the CPU and the main memory employs load/store mode, the characteristic of a load/store instruction lies in that a data length control sub-field is further provided in the functional unit operation control field of the instruction format, in the performing of a load/store operation, the operation type code field is set to instruction code corresponding to load/store; the return flag field and other portions of the functional unit operation control field are set to corresponding CPU internal operation codes; and the address/data field is filled with the data to be loaded.

11. An architecture according to claim 10, wherein
the data length control sub-field is provided at bit 46 and bit 478, the different codings of which correspond to four groups of 8-bit data; two groups of 16-bit data; two groups of 8-bit data and one group of 16-bit data; and one group of 32-bit data, respectively.

12. An architecture according to claim 11, wherein the ALU means comprises addition and subtraction component, multiplication and division component, shift operation component, and logic operation component, and input gating components for each of the operation components and output gating component for generating the result, the characteristics of the instruction system rendering the operation sequence programmable and employed by the architecture lie in:

multiplication and division control field, addition and subtraction control field, shift operation control field, logic operation control field, and data flow control field are included in the instruction format, each of them corresponds to each of the operation units respectively, the control codes of the operations required currently are given in the corresponding control fields, these codes control the operation of each of the operation components and the flowing direction of data in each of the components, thereby, achieving the object of operation sequence programmable.

* * * * *